(12) United States Patent
Uomori et al.

(10) Patent No.: US 6,897,946 B2
(45) Date of Patent: May 24, 2005

(54) RANGER FINDER DEVICE AND CAMERA

(75) Inventors: Kenya Uomori, Hirakata (JP); Takeo Azuma, Nara (JP); Atsushi Morimura, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 46 days.

(21) Appl. No.: 10/420,650

(22) Filed: Apr. 22, 2003

(65) Prior Publication Data

US 2003/0193658 A1 Oct. 16, 2003

Related U.S. Application Data

(62) Division of application No. 09/463,530, filed as application No. PCT/JP99/02715 on May 24, 1999, now Pat. No. 6,587,183.

(30) Foreign Application Priority Data

| | | |
|---|---|---|
| May 25, 1998 | (JP) | H10-142682 |
| Nov. 6, 1998 | (JP) | H10-316112 |
| Apr. 27, 1999 | (JP) | H11-119435 |

(51) Int. Cl.$^7$ .............. G01C 3/00; G01C 3/24; G01B 11/24
(52) U.S. Cl. .......... 356/3.1; 356/3.12; 356/15; 356/602; 356/603
(58) Field of Search .............. 356/3.01, 3.1, 356/3.05, 3.12, 602–605, 15

(56) References Cited

U.S. PATENT DOCUMENTS 2,172,098 A * 9/1939 Eppenstein .......... 356/15
4,325,640 A * 4/1982 Dreyfus et al. .......... 356/602

(Continued)

FOREIGN PATENT DOCUMENTS

| | | | |
|---|---|---|---|
| EP | 1102087 A2 * | 5/2001 | ........ G01S/7/481 |
| JP | 58-121008 | 7/1983 | |

(Continued)

OTHER PUBLICATIONS

Japanese Official Action dated Jun. 3, 2003.
Japanese search report for PCT/JP99/02715 dated Aug. 3, 1999.

(Continued)

*Primary Examiner*—Bernarr E. Gregory
*Assistant Examiner*—Brian Andrea
(74) *Attorney, Agent, or Firm*—RatnerPrestia

(57) ABSTRACT

A range finder device, for measuring, when a plurality of projected lights having radiation patterns whose light intensity differs three-dimensional space-wise are irradiated onto an object from a light source on a time-sharing basis to image-pick up reflected light of the projected light from the object with a camera, a distance using the light intensity of an image picked up, characterized in that, with respect to each of a plurality of surfaces including the center of the light source and the center of a lens, there is obtained, in advance, relation between an angle of each projected light from the light source and light intensity ratio in each surface, characterized in that, at the time of actual distance measurement, light intensity of each pixel of the camera is measured, and on the basis of the light intensity thus measured, and relation between the angle and the light intensity ratio on a predetermined surface corresponding to a coordinate position of the pixel measured, there is obtained the angle corresponding to the light intensity of the predetermined pixel thus measured, and characterized in that, on the basis of these light intensity measured, the angles obtained and further two-dimensional coordinate position information on the predetermined pixel on the image, a distance to the object is calculated.

5 Claims, 43 Drawing Sheets

U.S. PATENT DOCUMENTS

| | | | |
|---|---|---|---|
| 4,538,062 A | | 8/1985 | Shishido |
| 4,594,001 A | | 6/1986 | DiMatteo et al. |
| 4,802,759 A | * | 2/1989 | Matsumoto et al. ........ 356/603 |
| 4,908,648 A | | 3/1990 | Sawabe et al. |
| 5,082,362 A | * | 1/1992 | Schneiter ................... 356/3.03 |
| 5,085,502 A | * | 2/1992 | Womack et al. ............ 356/605 |
| 5,485,002 A | | 1/1996 | Kusaka |
| 5,838,428 A | * | 11/1998 | Pipitone et al. ............ 356/3.09 |
| 5,912,739 A | * | 6/1999 | Fowler et al. .............. 356/613 |
| 5,930,383 A | | 7/1999 | Netzer |
| 6,040,910 A | | 3/2000 | Wu et al. |

FOREIGN PATENT DOCUMENTS

| | | |
|---|---|---|
| JP | 59-218411 | 12/1984 |
| JP | 61-84515 | 4/1986 |
| JP | 2-1514 | 1/1990 |
| JP | 3-164709 | 7/1991 |
| JP | 4-136737 | 12/1992 |
| JP | 5-45124 | 2/1993 |
| JP | 05-502720 | 5/1993 |
| JP | 08-286100 | 11/1996 |
| JP | 10-48336 | 2/1998 |
| JP | 10-68871 | 3/1998 |
| JP | 11-194018 | 7/1999 |
| WO | WO 91/08439 | 6/1991 |

OTHER PUBLICATIONS

English translation of Form PCT/ISA/210.

Official Action from JPO, with dispatch date Apr. 2, 2002.

Carrihill and Hummel, "Experiments with the Intensity Ratio Depth Sensor", no. 32, pp. 337–358.

* cited by examiner 2a, 2b Light source
Fig. 2 (a)
Fig. 2 (b)
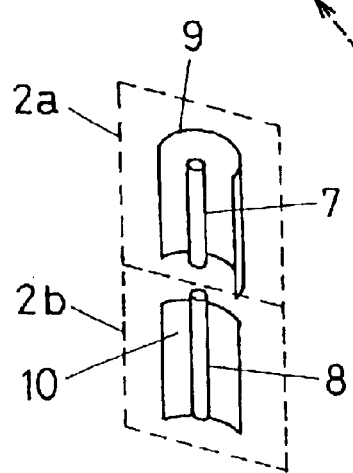
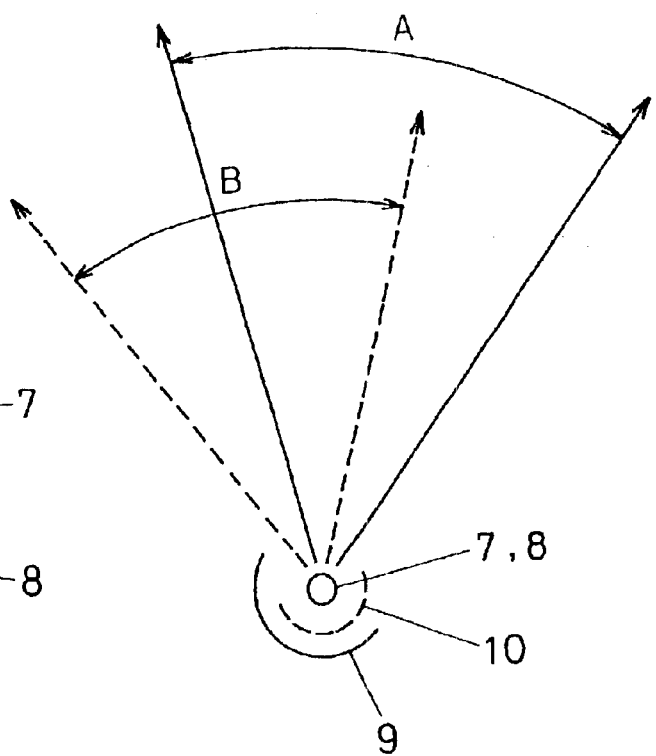

Fig. 22 (a)
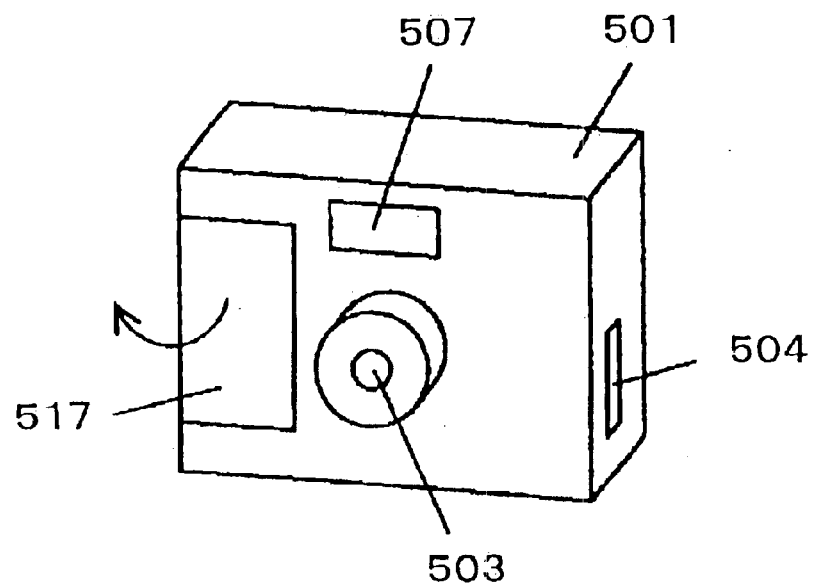
Fig. 22 (b)
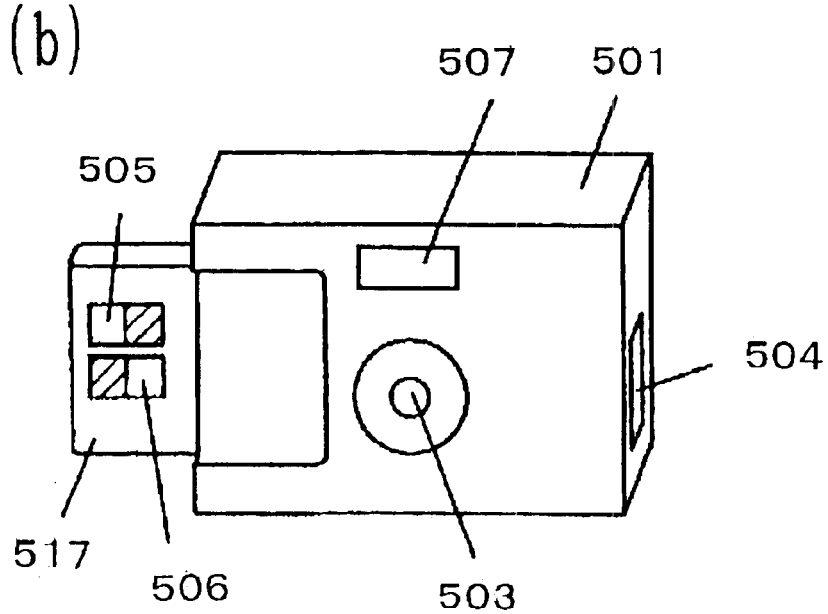

Fig. 23 (a)　During carrying
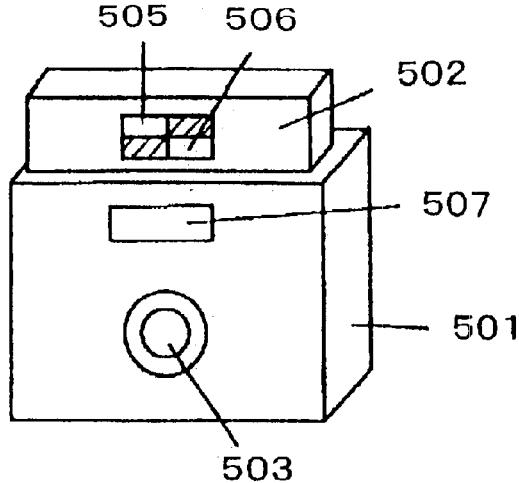
Fig. 23 (b)　During use
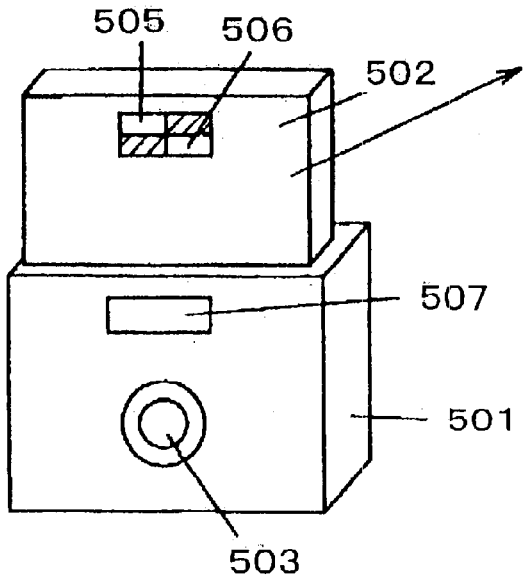
Fig. 23 (c)　Light source part
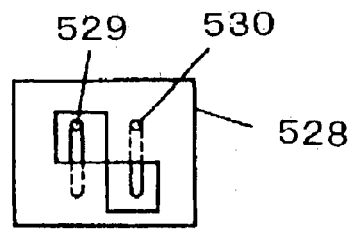

531 Liquid crystal barrier
529

When light modulation pattern 1 is generated

Light transmittance portion
Light intercepting portion

When light modulation pattern 2 is generated

Light transmittance portion
Light intercepting portion

During normal flashlight

Light transmittance portion

RANGER FINDER DEVICE AND CAMERA

This application is a divisional of U.S. patent application Ser. No. 09/463,530 filed Mar. 30, 2000 now U.S. Pat. No. 6,587,183, which is a U.S. National Phase Application of PCT International Application PCT/JP99/02715, filed on May 24, 1999.

TECHNICAL FIELD

The present invention relates to a range finder device for measuring a three-dimensional shape of an object.

A range finder device for performing three-dimensional shape measurement based on triangulation of projected light and an observed image, such as real-time operable range finder device shown in, for example, FIG. 40 has been proposed.

In FIG. 40, reference numerals 101A and 101B denote laser light sources having slightly different wavelengths; 102, a half mirror for synthesizing laser light from the laser light sources having the different wavelengths; 103, a light source control part for controlling light intensity of the laser light source; 104, a rotary mirror for scanning laser light; 105, a rotation control part for controlling the rotary mirror; 106, an object; 107, a lens for forming an image on a CCD; 108A and 108B, light wavelength separation filters for separating light having wavelength from the laser light source; 109A and 109B, CCDs for picking up a monochromatic image; 109C, a CCD for picking up a color image; 110A and 110., signal processing parts for a monochromatic camera; 111, a signal processing part for a color camera; 112, a distance calculation part for calculating a distance or a shape of an object from intensity of laser light photographed by CCDs 109A and 109B; and 113, a control part for adjusting synchronization of the entire device. Hereinafter, the description will be made of the operation of a range finder device thus configured.

The laser light sources 10A and 101B emit laser light having slightly different wavelengths. This laser light is a line light having a light cross-section perpendicular to the scanning direction of a rotary mirror (to be described later), and becomes a line light in the perpendicular direction when a rotary mirror scans in the horizontal direction.

FIG. 41 shows wavelength characteristics for these two light sources.

The reason why two light sources having close wavelengths to each other are used resides in the fact that it is less influenced by dependency of the reflection factor of the object on a wavelength. The laser light emitted from the laser light sources 101A and 101B is synthesized by the half mirror 102, and is scanned on the object 6 by the rotary mirror 104.

Scanning of the laser light is performed when the rotation control part 105 drives the rotary mirror 104 at one field period. At that time, light intensities of both light sources is varied as shown in FIG. 42(a) within one field period. The variations in the laser light intensity are synchronized by driving of the mirror angle, whereby the intensities of those two laser lights are monitored by CCD 109A and 109B to calculate the light intensity ratio, making it possible to measure time at one scanning period. If the light intensity is Ia/Ib, as shown in, for example, FIG. 42(b), the scanning time is measured to be to, and a rotation angle ($\phi$) of the rotary mirror 104 can be determined from the measured value.

The ratio of the intensities of those two laser lights and the mirror angle (that is, angle of the object as viewed from the light source side) are caused to have a one-to-one correspondence therebetween, whereby the distance or shape of the object can be calculated from a ratio of signal levels on which light from both light sources has been photographed in a distance calculation part (to be described later), in accordance with the principle of triangulation.

The lens 107 forms an image of the object on CCDs 109A, 109B and 109C. The light wavelength separation filter 108A transmits light in wavelength of the light source 10A, and reflects light in another wavelength. The light wavelength separation filter 108B transmits light in wavelength of the light source 101B, and reflects light in another wavelength. As a result, reflected light from the light sources 10A and 101B from the object is photographed by the CCDs 109A and 109B, and light of another wavelength is photographed by the CCD 109C as a color image.

The light source A signal processing part 110A and light source B signal processing part 1010B perform similar signal processing to the output from the CCDs 109A and 109B. The color camera signal processing part 111 performs an ordinary color camera signal processing to the output from the CCD 109C.

The distance calculation part 112 calculates a distance for each pixel using the signal level ratio, base length and coordinate values of pixels which have been photographed by the CCDs 109A and 109B for wavelength of each light source.

FIGS. 43(a) and (b) are explanatory views useful for graphically illustrating the distance calculation. In the figures, the reference character O denotes a center of the lens 107; P, a point on the object; and Q, a position of an axis of rotation of the rotary mirror. Also, for brevity, the position of the CCD 109 is shown turned around on the object side. Also, assuming the length of OQ (base length) to be L, an angle of P as viewed from Q in the XZ plane to be $\phi$, an angle of P as viewed from O to be $\theta$, and an angle of P as viewed from O in the YZ plane to be or, the three-dimensional coordinate of P can be calculated by the following formula (1) from the graphical relation.

$$Z = D \tan \theta \tan \phi / (\tan \theta + \tan \phi) \quad (1)$$

$$X = Z/\tan \theta$$

$$Y = Z/\tan \omega$$

The $\phi$ in the formula (1) is calculated by the light intensity ratio of laser light sources 101A and 101B monitored by the CCDs 109A and 109B, as described above, and $\theta$ and $\omega$ are calculated from coordinate values of pixels. Of the values shown in the formula (1), if all of them are calculated, the shape will be determined; and if only Z is determined, the distance image will be determined.

On the other hand, for photography of a place where light from the light source cannot be directly irradiated onto an object, there has been known a camera which uses an optical fiber. For example, in endoscopes to be used for examining the interior of a human body, there is a gastrocamera and the like. In the case of the gastrocamera, the inner walls of the stomach are normally irradiated by light irradiation from the optical fiber, and reflected light from the inner wall portion is received by another optical fiber which is guided by an external camera part, and this is two-dimensionally processed to display a normal image on a monitor.

As a conventional object extraction method, the technique called "Chroma key" used in broadcasting stations is generally used.

This method arranges an object in front of a studio set configured by the background of a single color (blue) for photographing, and judges that the blue portion is the background and any portions other than it as an attention object.

In such a conventional configuration as described above, however, a modulated light source and light source sweeping means are indispensable, and since mechanical operations are included, the reliability of the device is low and the device is expensive.

Also, although the laser element is normally modulated for use, the output and wavelength of the laser element vary depending upon the temperature, and, therefore, it is difficult to obtain stable measurements.

Also, as in case of the conventional endoscope or the like, for photography in a place where light from the light source cannot be directly irradiated onto an object, it is difficult to determine whether or not there is any projecting region, because the image is of two-dimensional data in a camera using the optical fiber.

DISCLOSURE OF THE INVENTION

The present invention has been achieved in light of such problems, and aims to provide a stable range finder device free from any mechanical operations, at a low cost.

It is another object of the present invention to provide a range finder capable of measuring a distance of an object in a place where light from a light source cannot be directly irradiated onto the object.

It is further another object of the present invention to provide a camera which is simple in configuration and compact in size.

That is, the present invention is a range finder device, for measuring, when a plurality of projected lights, having radiation patterns whose light intensity differs three-dimensional space-wise, are irradiated onto an object from a light source on a time-sharing basis to image-pick up reflected light of the projected light from the object with a camera, a distance using the light intensity of an image picked up.

In an exemplary embodiment of the present invention, with respect to each of a plurality of surfaces including the center of the light source and the center of a lens, there is obtained, in advance, relation between an angle of each projected light from the light source and light intensity in each surface.

In an exemplary embodiment of the present invention, at the time of actual distance measurement, light intensity of each pixel of the camera is measured, and on the basis of the light intensity thus measured, and relation between the angle and the light intensity on a predetermined surface corresponding to a coordinate position of the pixel measured, there is obtained the angle corresponding to the light intensity of the predetermined pixel thus measured.

In an exemplary embodiment of the present invention, on the basis of the light intensity measured, the angles obtained, and further two-dimensional coordinate position information on the predetermined pixel on the image, a distance to the object is calculated.

Further, the present invention is a range finder device, that includes a light source, a first optical fiber for guiding light to be emitted from the light source, light distribution means for dividing light guided by the first optical fiber into a plurality of courses, and a plurality of second optical fibers with one end connected to the light distribution means. The second optical fibers irradiate the light divided from an aperture at the other end thereof onto the object. The range finder device also includes image pickup means for receiving reflected light of the irradiated light to acquire image data of the object, and distance calculation means for calculating a distance to the object on the basis of the image data. Intensity of light to be irradiated onto the object from the other end of each of the plurality of second optical fibers has a distribution which is different.

Further, the present invention is a camera for shape measuring or object extracting, having light-emitting means for irradiating an object with projected light having a specified radiation pattern, and for picking up reflected light of the light-emitting means from the object to obtain a depth image using light intensity of the image picked up. The camera has a structure such that a distance between the light-emitting means and an image-pickup lens is variable, and the interval between the light-emitting means and the image-pickup lens can be sufficiently large during use of the camera.

BRIEF DESCRIPTION OF THE DRAWINGS

FIG. 2(a) is a perspective view illustrating the configuration of a light source in the range finder device according to the first embodiment, and FIG. 2(b) is a plan view showing the configuration of a light source in the range finder device according to the first embodiment;

FIGS. 22(a) and (b) are outside drawings illustrating a camera according to the fourth embodiment of the present invention;

FIGS. 23(a) to (c) are block diagrams illustrating a camera according to the fourth embodiment of the present invention;

(Description of the Symbols)

Figure 1:
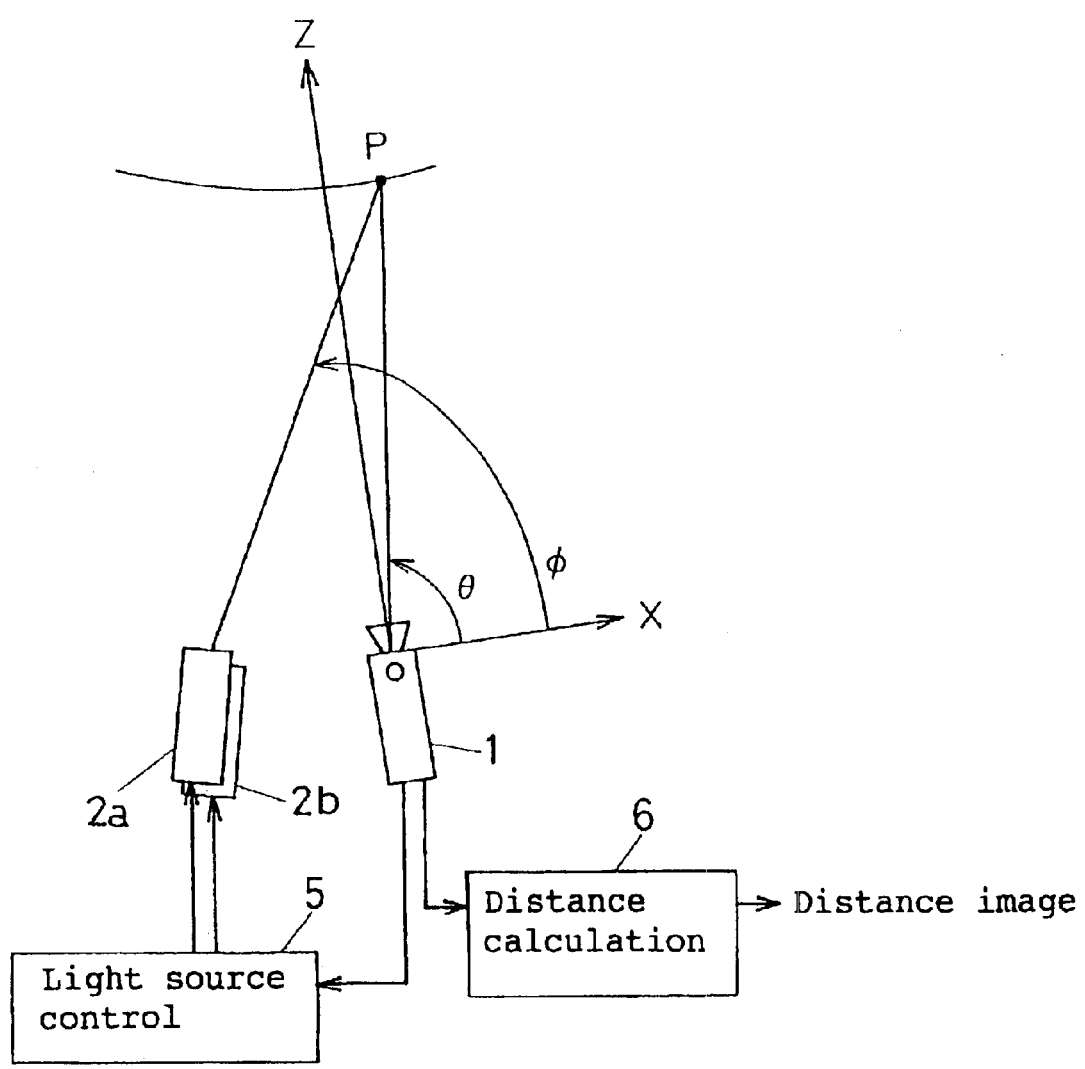
FIG. 1 is a block diagram illustrating the configuration of a range finder device according to a first embodiment of the present invention.

1 Camera
1a Infrared camera
2a Light source
2b Light source
3a Infrared transmission filter
3b Infrared transmission filter
4a ND filter whose transmittance varies in the horizontal direction
4b ND filter whose transmittance varies in the horizontal direction
5 Light source control part
6 Distance calculation part
7 Flash light source
8 Flash light source
9 Passive reflection plate
10 Passive reflection plate
11a Field memory a
11b Field memory b
12a Light intensity conversion part a
12b Light intensity conversion part b
13 Light intensity ratio calculation part
14 Distance conversion part
101A Laser light source
101B Laser light source
102 Half mirror
103 Light source control part
104 Rotary mirror
105 Rotation control part
106 Object
107 Lens
108A Light wavelength separation filter
108B Light wavelength separation filter
109A Image pickup element
109B Image pickup element
109C Color image pickup element
110A Camera signal processing part
110B Camera signal processing part
111 Color camera signal processing part
112 Distance calculation part
113 Control part
201 Semiconductor laser
202 First optical fiber
203 Light distributor
204 Collimator lens
206 Camera part 207 Second optical fiber
501 Housing
502 Housing 503 Lens
504 Recording media
505 First strobe
506 Second strobe
507 Finder
508 Strobe part
509 Camera body housing
510 Joint part
511 Camera body
512 Light source part housing
513 Light source part housing
514 Third strobe
515 Fourth strobe
516 Joint part
517 Light source part
518 Display panel
519 Touch panel
520 Object (foreground)
521 Object (background)
527 Portion judged to be the foreground by malfunction
528 Shading plate
529 Strobe light-emitting tube A
530 Strobe light-emitting tube B
531 Liquid crystal barrier
532 Display part
533 Image pickup part
534 Light control part
535 Distance calculation part
536 Color image calculation part
537 Control part
538 Media recording and reproducing part
539 Analysis part
540 Object (foreground)
541 Object (background)
542 Portion for which light from the light source part is intercepted
543 Light source part 3
544 Light source part 4
545 Camera mounting screws
546 Light source part housing (1)
547 Light source part housing (2)
548 Light source part fixing base
549 Light source part fixture (strobe shoe fitting)
550 Image memory
551 Passive reflection plate (1)
552 Passive reflection plate (2)
5100 Portion which has been judged to be the background.

Best mode for Carrying Out the Invention

Hereinafter, with reference to the drawings, descriptions of a range finder device according to embodiments of to the present invention will be provided.

(First Embodiment)

FIG. 1 is a block diagram illustrating a range finder according to a first embodiment of the present invention. In FIG. 1, the reference numeral 1 denotes a camera; 2a and 2b, light sources; 5, a light source control part; and 6, a distance calculation part. Hereinafter, the description will be made of an operation of the above-described configuration.

The light source control part 5 causes the light sources 2a and 2b to alternately emit light for each field period in synchronism with a vertical synchronizing signal of the camera 1. Light sources 2a and 2b may include flash light sources 7 and 8 such as xenon flash lamps that are lengthwise arranged and the directions of passive reflection plates behind them are laterally deviated as shown in, for example, FIG. 2(a). FIG. 2(b) is a plan view of FIG. 2(a). The light sources 2a and 2b radiate light within ranges A and B respectively. This xenon lamp has a small-sized light emitting portion, and one which can be regarded as a point light source as viewed from above. Further, the light sources 2a and 2b are lengthwise arranged, and the distance therebetween is about 1 cm, and these light sources appear as if light was emitted substantially from one point.

Figure 3:
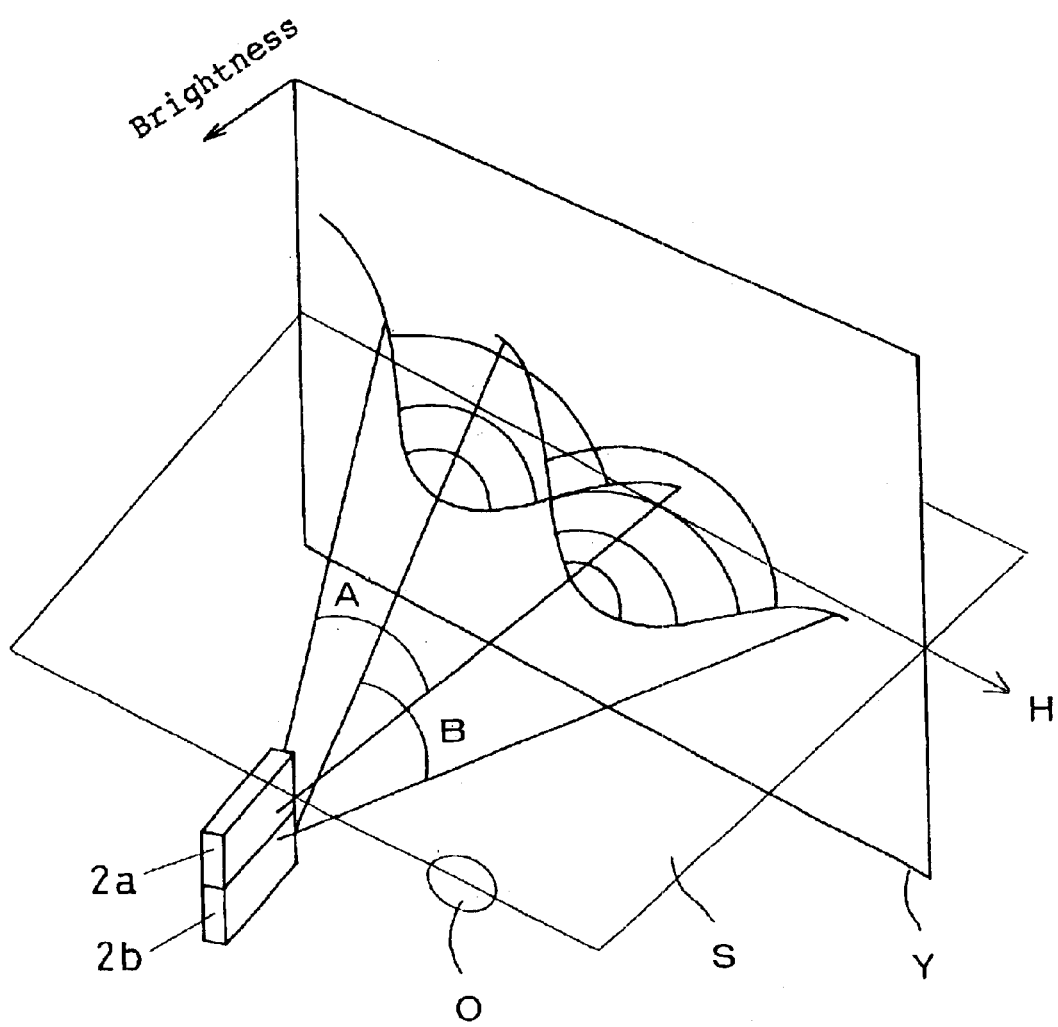
FIG. 3 is a view illustrating a light pattern of a light source according to the first embodiment.

An example of a light pattern to be radiated from such light sources is shown in FIG. 3. When light is projected onto a provisional screen, a size of the brightness of the screen surface is shown by a direction ->in the figure. That is, the respective light sources have characteristic properties that the screen surface is brightest at the central axis, and becomes darker toward the marginal portion. It is bright at the center and dark in the marginal portion in this manner because semi-cylindrical passive reflection plates 9 and 10 are located behind the flash light sources 7 and 8. Also, the directions of those semi-cylindrical passive reflection plates 9 and 10 are deviated, and the respective projected light is emitted so that it is partially overlapped.

Figure 4:
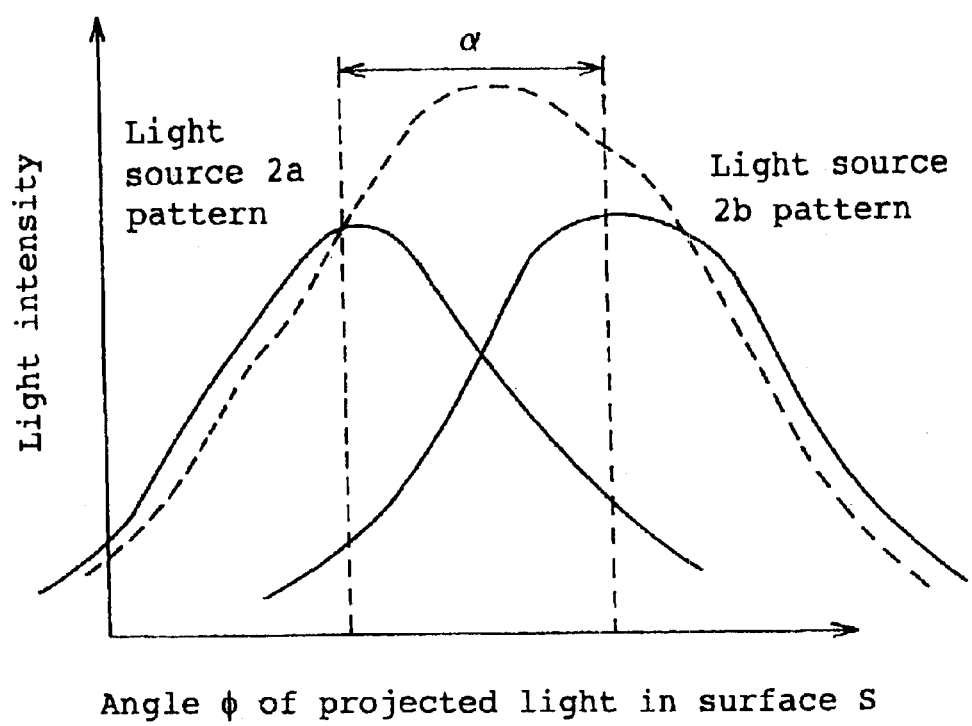
FIG. 4 is a view illustrating a light pattern of a light source according to the first embodiment and a light pattern in the case of emitting a plurality of lights.

FIG. 4 shows the relationship between angles of projected light from the light sources and light intensity in a plane of the H direction of FIG. 3. This H direction is a direction of a crossing line between an arbitrary plane S, of a plurality of planes including the center of the light source and the lens center, and the above-described provisional screen. In the a portion of these light patterns, light to be irradiated from the two light sources into the object space becomes bright on the right side in one and bright on the left side in the other, as viewed from each light source. This pattern varies, however, also in the height-wise direction (Y direction).

Figure 5:
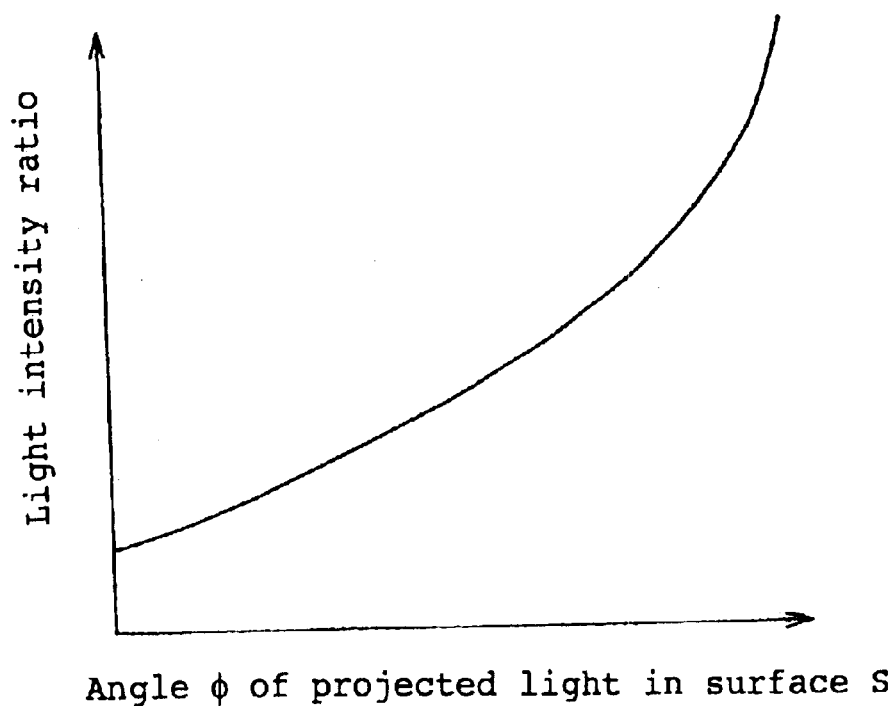
FIG. 5 is a view illustrating the relationship between a light intensity ratio according to the first embodiment and an angle $\phi$ from a light source.

FIG. 5 indicates the relationship between the light intensity ratio in the object illumination by the two projected lights, and an angle φ, made by the X-axis, of the one obtained by projecting the projected light onto the XZ plane in the α portion in FIG. 4. In the α portion, the relationship between the light intensity ratio and angle φ is a one-to-one correspondence. In order to measure distance, two types of light patterns are alternately projected onto a plane, which are spaced apart by a predetermined distance from the light sources and are set up vertically, and such data on the relationship between the light intensity ratio and the angle of projected light as is shown in FIG. 5 is obtained in advance for each Y-coordinate (which corresponds to Y-coordinate on CCD) from the result obtained by image-picking up this reflected light with the camera 1. The "for each Y-coordinate" means for each of a plurality of planes including the light source center and the lens center.

Also, if the light sources are located such that a segment between the lens center of the camera 1 and the light sources runs parallel to the X-axis of the CCD image pickup surface, distance calculations can be accurately performed through the use of data relating to the light intensity ratio determined for each Y-coordinate and the angle of projected light. Hereinafter, the description will be made of a distance calculation method using the light intensity ratio.

When a point P in FIG. 1 is set to an attention point, an angle φ of the point P as viewed from the light sources is measured through the use of a luminance ratio obtained from image pickup data when two types of light patterns are irradiated concerning the point P in an image picked up by the camera 1, and the relation of FIG. 5 corresponds to a Y-coordinate value of the point P. In this respect, an assumption is made that the relation of FIG. 5 has characteristic properties that vary depending upon the Y-coordinate value as described above, and that the relationship between the light intensity ratio and an angle φ from the light sources in the horizontal direction has been prepared by a preliminary measurement for each Y-coordinate. Also, an angle θ with respect to the point P as viewed from the camera is determined by the position (that is, pixel coordinate value of the point P) of the image, and a camera parameter (focal length, optical center position of the lens system). Thus, the distance is calculated from die two angles and a distance (base length) between the light source position and the optical center position of the camera in accordance with the principle of triangulation.

Assuming that the optical center of the camera is the origin, setting the optical axis direction of the camera as the Z-axis, the horizontal direction as X-axis, and the perpendicular direction as Y-axis, and assuming an angle, made by the X-axis, of the direction of the attention point as viewed from the light source to be φ, an angle, made by the X-axis, of the direction of the attention point as viewed from the camera to be θ, and the light source position to be (0, -D), that is, the base length to be θ, and the depth value Z of the attention point P can be calculated from the above-described formula (1)

$$Z = D \tan\theta \tan\phi / (\tan\theta - \tan\phi)$$

According to the present embodiment as described above, a distance is measured by correcting any variations in the light intensity generated by the light sources or the optical system at the time of measuring the distance by means of a range finder using light intensity, whereby it is possible to realize a stable range finder device with high precision capable of implementation by electronic operations.

In this respect, at the front of an infrared camera having a range finder according to the present embodiment, a half mirror or a dichroic mirror and a color camera are arranged, whereby a color image having the same viewpoint as the distance image can be obtained. In this respect, in the distance calculation part according to the present embodiment, the description has been provided where only the distance Z is calculated to output the calculation result as a distance image, but it may be possible to output three-dimensional coordinate data by calculating all three-dimensional coordinate values X, Y and Z from formulas (1) and (2) using an angle ω shown in FIG. 6, and this technique is included in the present invention.

$$X = Z / \tan\theta$$
$$Y = Z / \tan\omega \qquad (2)$$

In this respect, in the present embodiment, if light sources 2a and 2b emit light at the same time, and are used as a normal flash lamp in which brightness in one center is great and the marginal portion becomes dark as indicated by a dotted line in FIG. 4, a normal two-dimensional image can be image-picked up.

Also, in the present embodiment, if an infrared passing filter is inserted at the front of the light source 2 and a filter having sensitivity in an infrared wavelength area is used for the camera 1, it is possible to prevent lighting of a flashlight from hindering the user or an image pickup picture by the user or the other camera. Also, if an image is image-picked up coaxially with the infrared camera and by an ordinary color camera using a half mirror, a dichroic mirror and the like, a depth image and a texture image corresponding thereto can also be image-picked up at the same time.

Also, in the present embodiment, since the flashlight flashes for a given time (e.g., hundreds of microseconds), if the camera 1 is set so as to be exposed by means of a shutter operation only during such time period, it is possible to suppress the background light from affecting the distance measurement and to image-pick up a distance image even in a place which is bright to some degree.

Also, in the present embodiment, two types of light patterns are irradiated onto an object, and the light intensity ratio for each pixel is calculated using image pickup pictures in the respective cases. It may be possible, however, to also image-pick up an image when no light pattern is irradiated and obtain three types (two types of light patterns and one type of no light pattern) of images in total for calculations. In this case, to calculate the light intensity ratio for each pixel, a differential value obtained by subtracting light intensity in the absence of any light pattern from the respective light intensity values during light pattern irradiation will be calculated. Then, a ratio of these differential values will be calculated to determine the light intensity ratio. Thus, in the case of image pickup in a bright place, it is possible to suppress distance calculation error based on background light.

(Second Embodiment)

Figure 7:
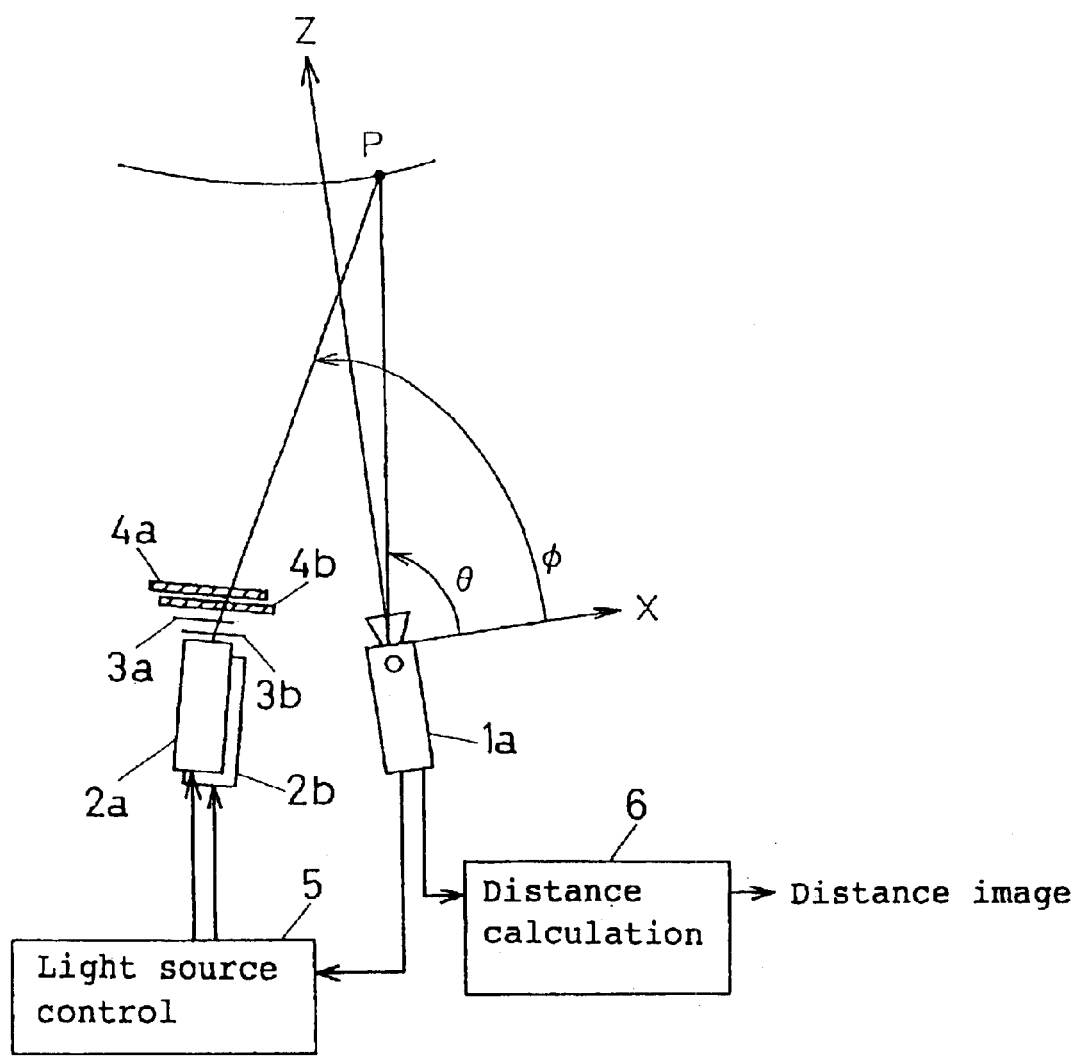
FIG. 7 is a block diagram illustrating the configuration of a range finder device according to a second embodiment of the present invention.

FIG. 7 is a block diagram showing a range finder device according to a first embodiment of the present invention. In FIG. 7, the reference numeral 1a denotes a camera having sensitivity in infrared light; 2a and 2b, light sources; 3a and 3b, infrared transmission filters; 4a and 4b, ND filters whose transmittance varies in the horizontal direction; 5, a light source control part; and 6, a distance calculation part. Hereinafter, the description will be made of an operation of the above-described configuration.

The light source control part 5 causes the light sources 2a and 2b to emit light for each field period in synchronism with a vertical synchronizing signal of the infrared camera 1a. Light sources 2a and 2b may include a xenon lamp, which flashes, and has a small-sized light emitting portion, (which can be regarded as a point light source). Also, the light sources 2a and 2b are arranged in the vertical direction.

At the front of each light source, there are arranged infrared transmission filters 3a and 3b, and ND filters 4a and 4b. The transmittance of the ND filter 4a, 4b varies in the horizontal direction. FIG. 2 shows a relation between an angle from the light source in the horizontal direction and the transmittance of the ND filters 4a and 4b.

Because of these ND filters, light to be irradiated in object space from the two light sources becomes bright on the right side in one of the light sources, and bright on the left side in the other of the light sources, as viewed from the light sources. As a result, light which is bright on the right side or on the left side as described above is alternately projected onto the object for each field period.

FIG. 5 illustrates the relationship between the light intensity ratio of the two projected lights and an angle from the light sources in the horizontal direction. Hereinafter, the description will be made of a distance calculation method using the light intensity ratio.

When a point P in FIG. 7 is set to an attention point, an angle of the point P as viewed from the light source is measured from a luminance ratio between fields concerning the point P in an image image-picked up by the camera 1a through the use of the relationship illustrated in FIG. 5. Also, an angle with respect to the point P as viewed from the camera is determined from the position (that is, pixel coordinate value of the point P) in the image, and a camera parameter (focal length, optical center position of the lens system). Thus, the distance is calculated from the two angles and a distance (base length) between the light source position and the optical center position of the camera in accordance with the principle of triangulation.

Assuming the optical center of the camera to be the origin, setting the optical axis direction of the camera as the Z-axis, the horizontal direction as the X-axis and the vertical direction as the Y-axis, and assuming an angle, made by the X-axis, of the direction of the attention point as viewed from the light source to be $\varphi$, an angle, made by the X-axis, of the direction of the attention point as viewed from the camera to be $\theta$, and the light source position to be $(0, -D)$, that is, the base length to be D, the depth value Z of the attention point P can be calculated using the following formula:

$$Z = D \tan \theta \tan \varphi / (\tan \theta - \tan \varphi)$$

Figure 8:
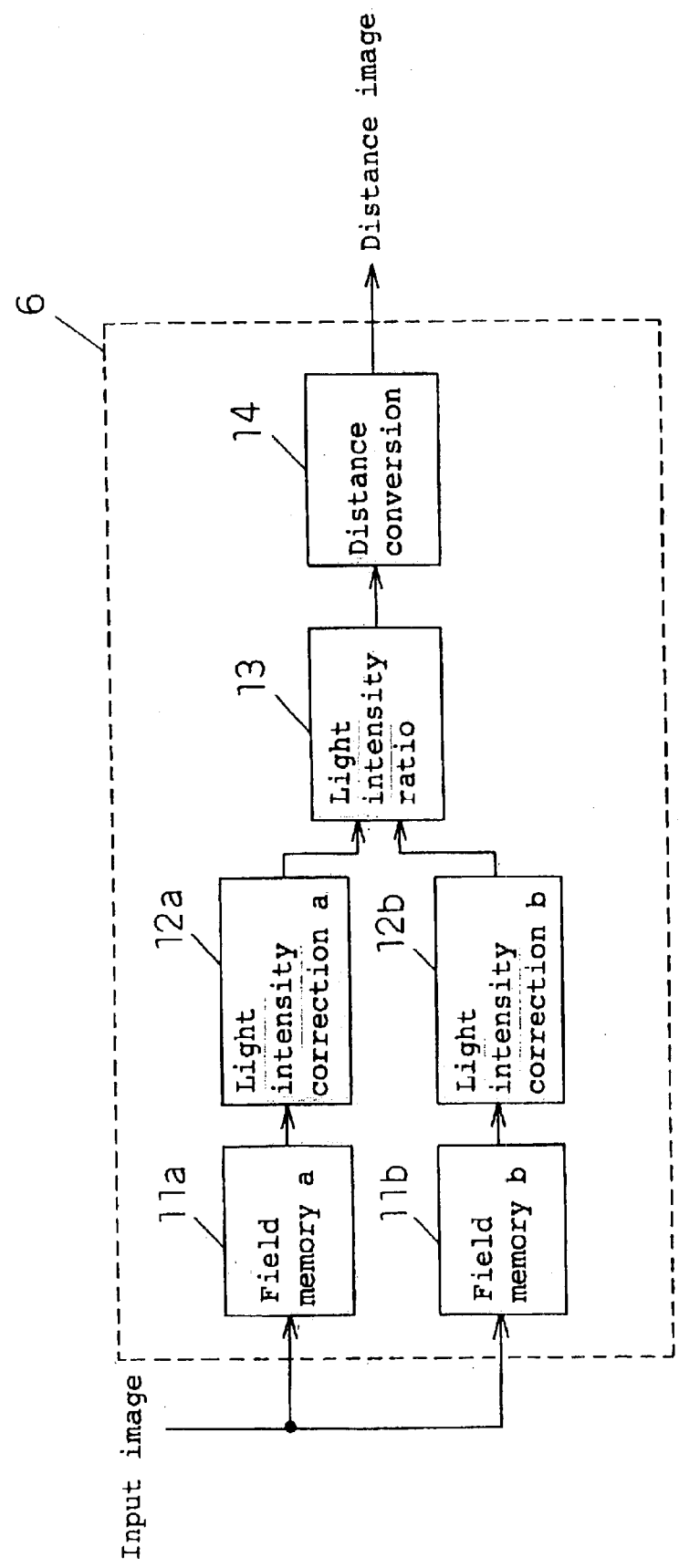
FIG. 8 is a block diagram illustrating a distance calculation and a light intensity conversion according to the second embodiment.

The distance calculation part 6 calculates a distance image from a video signal of the camera 1a. The calculation method may be accomplished in the same manner as in the first embodiment. Another method of performing more accurate measurements is described below. FIG. 8 is a block diagram illustrating the distance calculation part 6. In FIG. 8, the reference numerals 11a and 11b denote field memories; 12a and 12b, light intensity correction means; 13, light intensity ratio calculation means; and 14, distance conversion means. Hereinafter, the description will be made of the operation of each component.

An image image-picked up by the camera 1a is written in the field memories 11a and 11b by each field.

Figure 9:
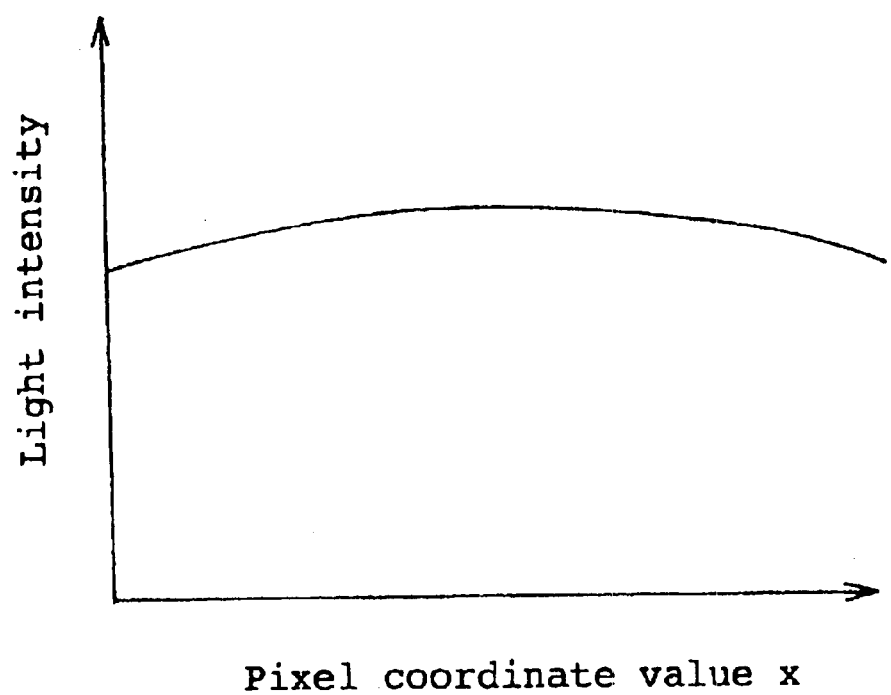
FIG. 9 is a view illustrating a change in X-coordinate of light intensity in the second embodiment.

The light intensity correction means 12a and 12b are for correcting the light intensity written in the field memories. The reason for the correction will be described below. FIG. 9 illustrates the relationship between the light intensity to be image-picked up and the pixel coordinate value when light is irradiated (in a state free from any ND filter) on a screen having a fixed distance Z from a point light source to image-pick up light reflected by the surface. FIG. 9 only illustrates the horizontal direction (one-dimension) for brevity, but the light intensity also shows curvilinear distribution in the vertical direction.

This distribution, may result from, for example, peripheral extinction based on the lens system of the camera, variations in intensity of reflected light caused by variations in the angle of incidence of a ray of light with respect to the object surface, and variations in light intensity due to an angle from the light sources. Since the variations in light intensity result in errors at the time of observing the light intensity ratio, that is, errors during distance measurement, it becomes necessary to convert the light intensity in order to improve the accuracy of the distance measurement. The presence of these errors may cause any portion other than a monotonous increasing curve in the characteristic curve of FIG. 5. In such a portion, the light intensity and the angle do not have a one-to-one correspondence therebetween, and as a result, the measurement result is disturbed. Also, if not for these errors, the light intensity (ratio) in the Y-axis direction would advantageously be constant, and one conversion table as shown in FIG. 5 would be used (in the first embodiment, a conversion table for the number for Y-coordinate value is required).

In order to reduce the measurement errors in the light intensity conversion means 12a and 12b, a two-dimensional curve distribution of light intensity in an image on a screen spaced apart by a reference distance in the absence of the ND filter is measured in advance, and at the time of obtaining the relationship (corresponding to FIG. 5) between the light intensity and the angle of the projected light, and at the time of measuring an actual distance of the object, the light intensity of the field memory is corrected and converted in accordance with the curve distribution of light intensity measured in advance. A factor (that is, the ratio of light intensity picked up in each pixel corresponding to a peak value or an arbitrary value) for correcting the curve distribution of light intensity to a fixed value is held as a two-dimensional LUT (look-up table), and the correction and conversion are performed by multiplying the data in the field memory by a correction factor for each pixel.

If a distance of arranging the object is known in advance, the reference distance is set to a value close to the known distance, thereby making it possible to improve the accuracy at the time of measuring the distance.

According to the present embodiment as described above, a distance is measured by correcting any errors in light intensity caused by a light source or an optical system at the time of measuring the distance by means of a range finder using light intensity, whereby it is possible to realize a stable range finder device with high precision capable of implementation by electronic operations.

In this respect, at the front of an infrared camera having a range finder according to the present embodiment, a half mirror or a dichroic mirror and a color camera are arranged, whereby a color image having the same point of view as the distance image can be obtained.

Figure 6:
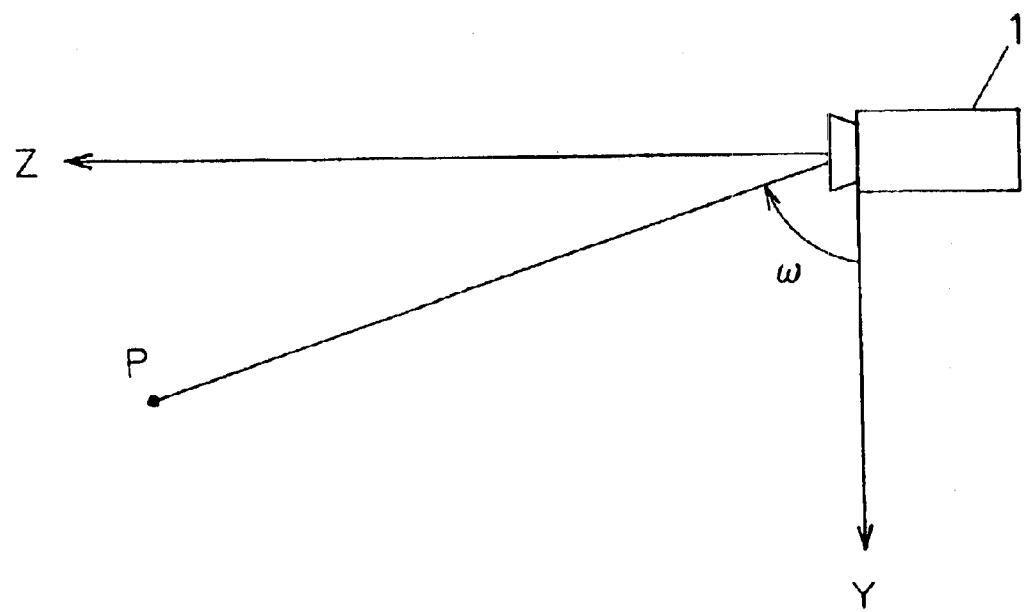
FIG. 6 is a calculation conceptual view illustrating three-dimensional positions X, Y and Z in the first embodiment.

In this respect, in the distance calculation part according to the present embodiment, a description has been presented where only the distance Z is calculated and the calculation result is outputted as the distance image, but it is possible to calculate all of the three-dimensional coordinate values X, Y and Z using the angle $\omega$ shown in FIG. 6 from the following formulas:

$$Z = D \tan \theta \tan \varphi / (\tan \theta - \tan \varphi)$$

$$X = Z/\tan \theta$$

$$Y = Z/\tan \omega$$

and to output the corresponding three-dimensional coordinate data.

In this respect, regarding the light intensity correction in the distance calculation according to the present embodiment, when the object is spaced apart from the reference distance, the position of pixels to be image-picked up is shifted (that is, a parallax occurs) and therefore, the distance measurement precision is deteriorated. In such a case, a plurality of light intensity corrections for the reference distances can be prepared in advance, such that the correction for a certain reference distance is first performed to calculate the distance, and subsequently, the distance is calculated again by using a correction amount for a reference distance close to the previous case thereby making it possible to improve the measurement precision.

In this respect, in the present embodiment, if light sources 2a and 2b emit light at the same time, and are used as a normal flash lamp in which brightness in one center is great and the marginal portion becomes dark as indicated by the dotted line in FIG. 4, a normal two-dimensional image can be picked up.

Also, in the present embodiment, if an image is picked up coaxially with the infrared camera and by an ordinary color camera using a half mirror, a dichroic mirror, and the like, a depth image and a texture image corresponding thereto can also be picked up at the same time.

Also, in the present embodiment, since the flashlight flashes for a certain period of time (e.g., hundreds of microseconds), if it is set such that the camera 1 is exposed by means of a shutter operation only during that period of time, it is possible to suppress the background light from affecting the distance measurement and to pick up a distance image even in a place which is bright to some degree.

Also, in the present embodiment, two types of light patterns are irradiated onto an object, and the light intensity ratio for each pixel is calculated using image pickup pictures. It may be possible, however, to also pick up an image when no light pattern is irradiated and to obtain three types (two types of light patterns and one type of no light pattern) of images in total for the calculations.

In this case, in calculating the light intensity ratio for each pixel, a differential value obtained by subtracting light intensity without light pattern from the respective light intensity values during light pattern irradiation will be calculated. Then, a ratio of these differential values will be calculated to convert it to the light intensity ratio. Thus, in the case of image-picking up in a bright place, it is possible to suppress distance calculation error based on background light.

Also, for the light pattern to be projected onto an object in the present embodiment, it may be possible to use a light transmission type liquid crystal display device (e.g., a device used in an ordinary liquid crystal video projector) one light source in place of the ND filters 4a and 4b whose transmittance varies in the horizontal direction, and the light sources 2a and 2b. These ND filters and two light sources are switched to a light transmission pattern of the light transmission type liquid crystal display device such that the light source emits light twice, or that the light source is left lighted to switch to two types of light patterns of the light transmission type liquid crystal display device, whereby it is possible to irradiate two types of light patterns onto the object on a time-shared basis.

(Third Embodiment)

Figure 10:
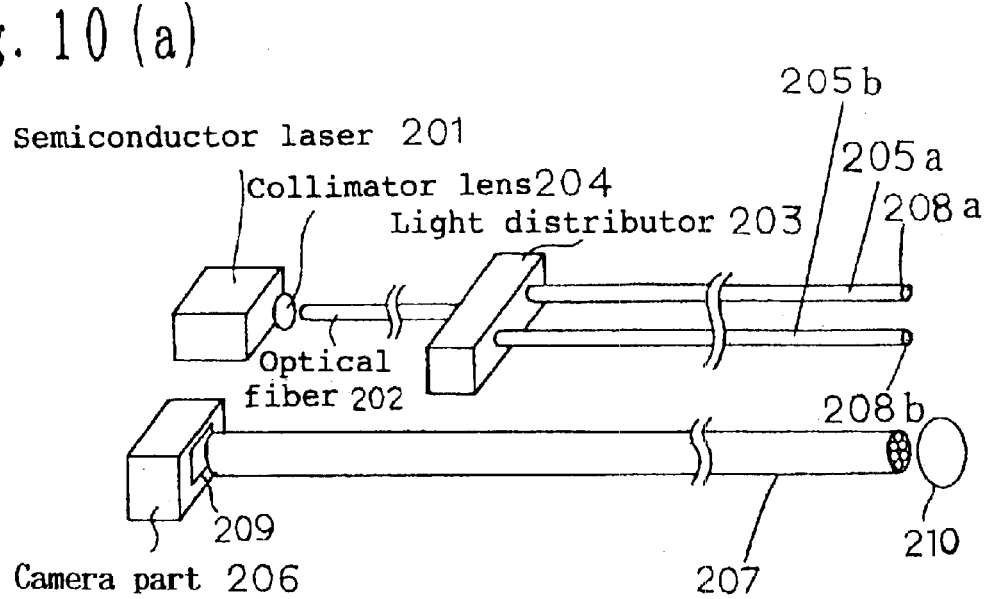
FIG. 10(a) is a block diagram illustrating the configuration of a range finder device according to a third embodiment of the present invention.
FIG. 10(b) is a block diagram illustrating the configuration of a modification of a range finder device according to the third embodiment of the present invention.
Figure 10:
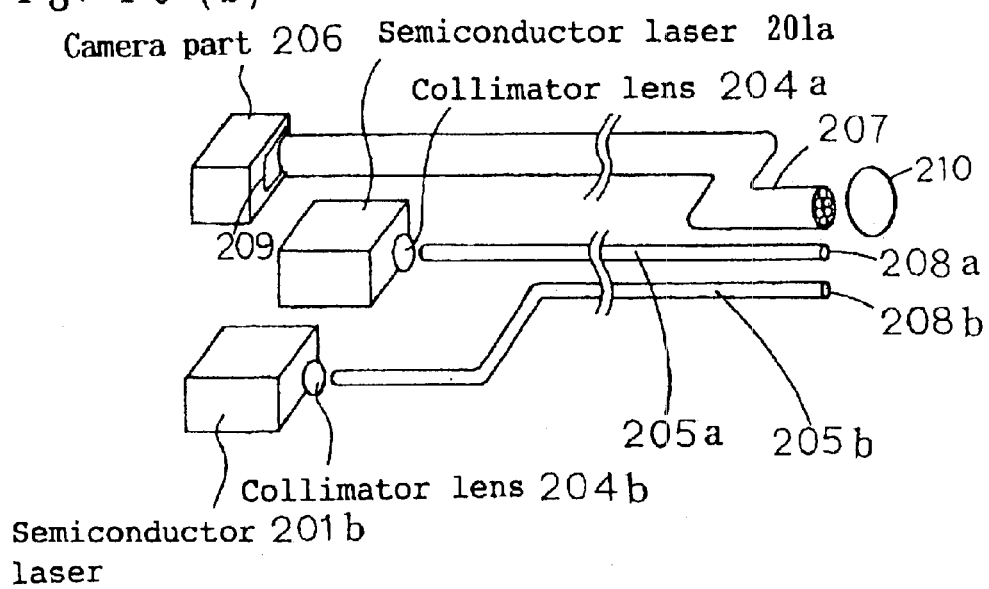

FIG. 10(a) is a schematic perspective view illustrating a third embodiment of a range finder according to the present invention. With reference to the figure, the description will be made of the configuration of the present embodiment hereinafter.

As shown in FIG. 10(a), a semiconductor laser 201 is an exemplary light source means for emitting light with a wavelength λ. A first optical fiber 202 is an exemplary means for guiding light to be emitted from the semiconductor laser 201 to a light distributor 203. Also, a collimator lens 204 is arranged between the first optical fiber 202 and the semiconductor laser 201. The light distributor 203 is an exemplary light distribution means for dividing the light guided through the first optical fiber 202 into two courses. Also, the light distributor 203 has a shutter mechanism, and is an exemplary means for transmitting the divided light to second optical fibers a and b on a time-shared base. The second optical fiber a (205a) and the second optical fiber b (205b) are each connected at one end thereof, to the light distributor 203 for irradiating the light divided from an aperture at the other end onto an object (for example, the inner walls of the stomach, or the like). A camera part 206 is an exemplary image pickup means for acquiring image data of the object received through light-receiving optical fiber bundle 207 by means of reflected light from the object. In this respect, at the tip end of the light-receiving optical fiber bundle 207, there is arranged a lens 210 in proximity thereto. CCD 209 is an image pickup element mounted to the camera part 206 so as to receive light from the light-receiving optical fiber bundle 207. Light to be irradiated from the aperture 208a of the second optical fiber a (205a) has a light intensity distribution as shown in FIG. 4 which has been described in the embodiment. Light to be irradiated from the aperture 208b of the second optical fiber b (205b) is also the same. These lights have different light intensity distributions depending upon the position in the horizontal direction because light to be emitted from the aperture of the optical fiber diffuses based on the angular aperture. Therefore, by adjusting the angular aperture, the shape of the light intensity distribution can be changed. In this respect, the angular aperture can be adjusted to some degree by setting the refractive index of the optical fiber in the diameter-wise direction to a predetermined value.

In this respect, a range finder according to the present embodiment has distance calculation means (not shown) provided with the same function as the distance calculation part 6 described in the embodiment, for calculating a distance up to the object on the basis of image data from the camera part 206. Also, for both the first optical fiber 202 and the second optical fibers a and b (205a and 205b), or either of them, the optical fiber bundle may be used as a matter of course.

With the above-described configuration, the operation of the present embodiment will be described with reference to FIG. 10(a).

A range finder according to the present embodiment can be utilized as an endoscope such as a gastrocamera.

More specifically, the tip ends of the second optical fibers a and b (205a and 205b) and the tip end of the light-receiving optical fiber 207 may be inserted into the stomach of a patient.

From the apertures of the second optical fibers a and b, light having a light intensity distribution characteristic as shown in FIG. 4 is irradiated on the time-shared basis as in the first embodiment. The light-receiving optical fiber 207 receives light reflected by this light. Further, the camera part 206 transmits the image data on the inner walls of the stomach obtained from this light reflected to the distance calculation part. The distance calculation part calculates, as in the case of the first embodiment, the three-dimensional distance data on the inner walls of the stomach for output. The distance data output is transmitted to a monitor (not shown) to be three-dimensionally displayed. A doctor can, while viewing the monitor, view the image of the diseased portion which has been three-dimensionally displayed by moving the tip end of the second optical fiber. Thus, the doctor can more accurately examine the patient than before.

In this respect, in the above-described embodiment, a description has been provided of a range finder configured by one semiconductor laser as the light source part, however, the present invention is not limited thereto, and a range finder configured by two light source parts as shown in, for example, FIG. 10(b), may be used. More specifically, in this case, semiconductor lasers 201a and 201b as the light source part are provided with optical fibers 205a and 205b for individually guiding the light emitted on the object side to irradiate the object. Also, a collimator lens 204a, 204b is arranged between each optical fiber 205a, 205b and each semiconductor laser 201a, 201b. Such a configuration exhibits the same effect as described above.

Also, in the above-described embodiment, the description has been made of the configuration in which there is provided a light distributor 203 between the first optical fiber 202 and two second fibers 205a and 205b, however, the present invention is not limited thereto, and the light distributor 203 and the second optical fibers 205a and 205b may be constructed such that light guided from the first optical fiber is divided into two courses at the tip end portion of the fiber and light branch means (not shown) are provided for irradiating the object. In this case, the second optical fiber can be omitted, while the same effect as described above is exhibited.

Figure 11:
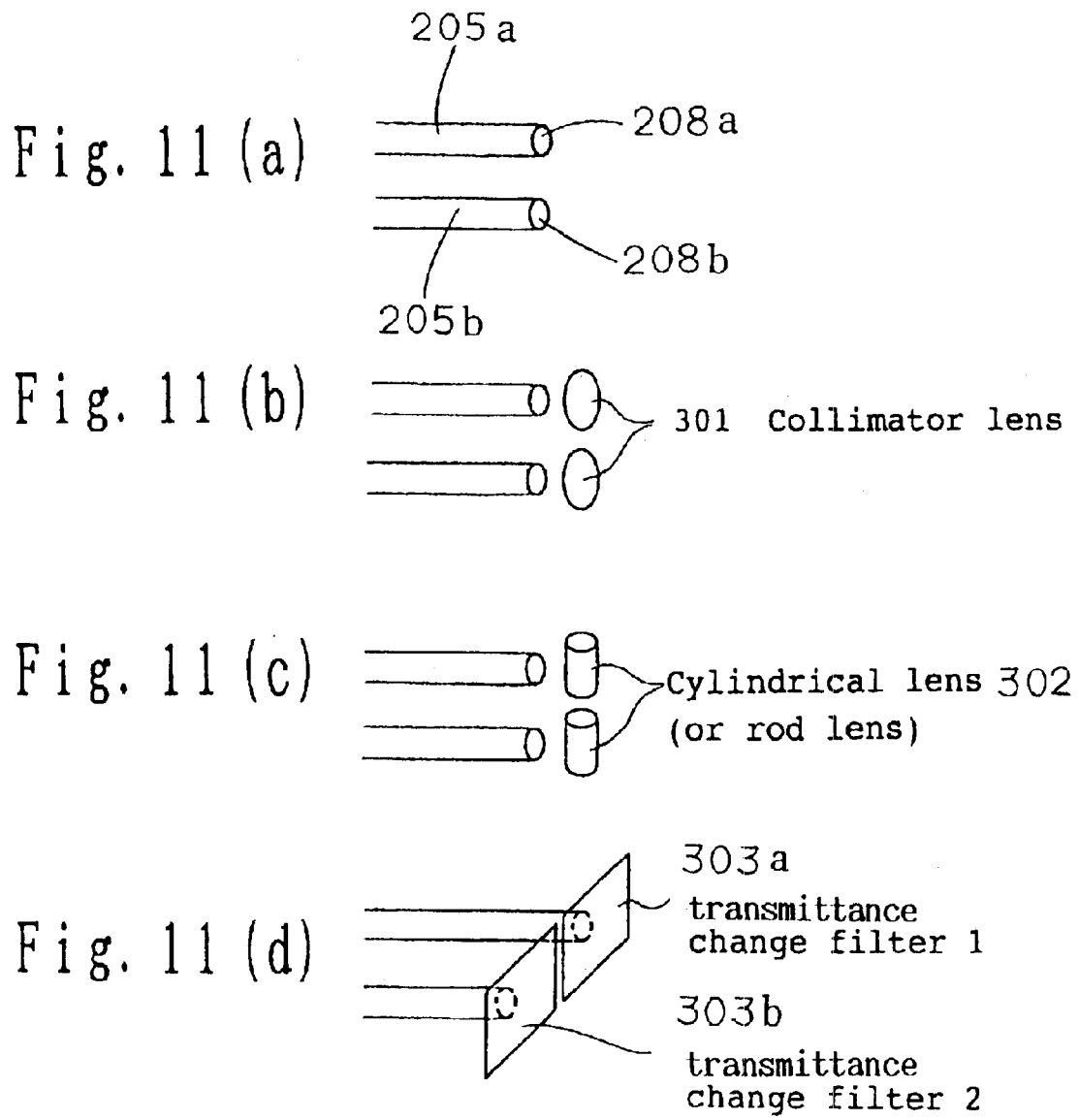
FIGS. 11(a) to (c) are explanatory views illustrating an arrangement of a lens system according to the third embodiment.
FIG. 11(d) is an explanatory view illustrating an arrangement of a transmittance change filter according to the third embodiment.

Also, in the above-described embodiment, the description has been made of a configuration in which nothing has been provided in front of the optical fibers 205a and 205b as shown in FIG. 11(a), however, the present invention is not limited thereto, and it is possible to arrange a collimator lens 301 (See FIG. 11(b).) at the front of the aperture 208a, 208b of each optical fiber 205a, 205b, or to arrange a cylindrical lens (or a rod lens) 302 (See FIG. 11(c).) at the front of each aperture 208a, 208b. This enables the intensity of light to be irradiated from the aperture to be position-wise uniformly varied. In this respect, it is also possible to output light, which has no different local light intensity, from the front of each aperture 208a, 208b, and instead, to arrange a transmittance change filter 1 (303a) and a transmittance change filter 2 (303b), whose light transmittance differs position-wise, at the front of each aperture 208a, 208b.

Figure 12:
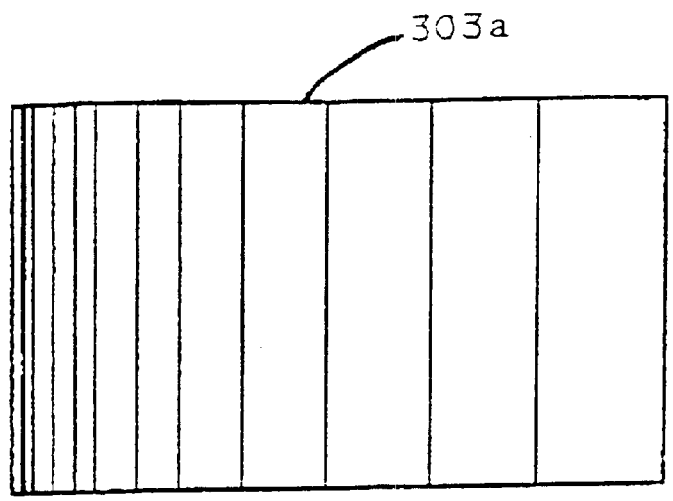
FIG. 12(a) is an explanatory view illustrating the transmittance change filter according to the third embodiment.
FIG. 12(b) is an explanatory view illustrating a distribution of light intensity based on the transmittance change filter according to the third embodiment.
Figure 12:
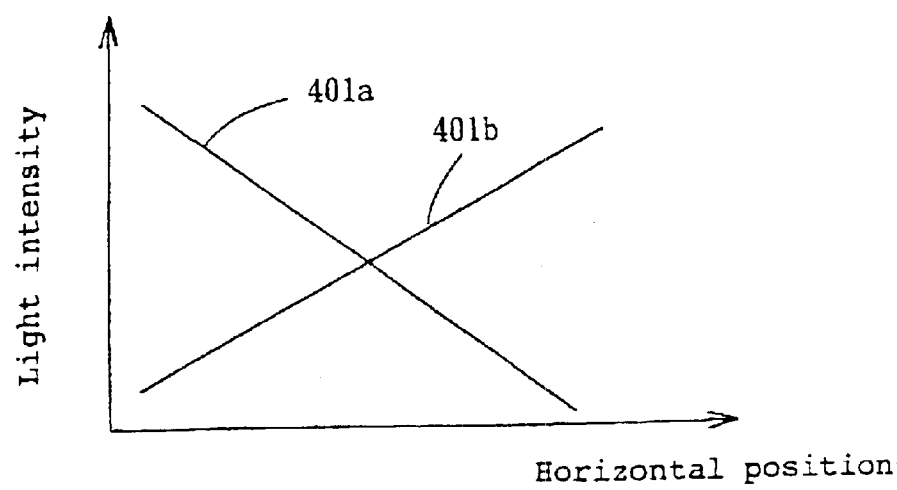

With reference to FIGS. 12(a) and (b), a further description of the characteristic properties of the filter shown in FIG. 11(d) is provided.

The intensity distribution of light that passes through the transmittance change filter 1 (303a) shown in, for example, FIG. 12(a), is set as denoted by the reference numeral 401a in FIG. 12(b). In contrast, the intensity distribution of light that passes through the transmittance change filter 2 (303b), is set as denoted by the reference numeral 401b in FIG. 12(b). FIG. 12(b) illustrates the light intensity distribution for a range α shown in FIG. 4. The present invention can be implemented even if such a transmittance change filter is used.

Also, in the above-described embodiment, a description has been provided where the light distributor includes a shutter mechanism such that the object is irradiated with light on a time-shared basis, however, the present invention is not limited thereto. For example, light from the light source includes light having a plurality of frequencies, and the light distributor may be provided with a filter, whereby light having a different wavelength is irradiated from the aperture. Thus; the camera part is provided with a filter and a light-receiving element, capable of distinguishing between these two types of wavelengths, thereby making it possible to irradiate the object with each light having two types of wavelengths at the same time. This reduces the measuring time. In FIG. 10(b), if the wavelength of the semiconductor lasers 201a and 201b are different from each other, and the camera part 206 is provided with a filter and a light-receiving element, capable of distinguishing between these two types of wavelengths, it is possible to reduce the measurement time, as described above.

Also, in the above-described embodiment, a semiconductor laser has been used as the light source, however, the present invention is not limited thereto. For example, a LED, a lamp or the like may be used as the light source.

A description of a camera according to the present invention is now provided. Through this exemplary embodiment, a range finder device that is more compact and having a simple configuration is provided.

More specifically, in the above-described range finder device, the light passive reflection plates are disposed in a deviated relationship with each other with respect to the light sources 2a and 2b as shown in FIG. 2. In such an arrangement it is typical to mount light filters whose light transmittance differs depending upon the horizontal place in front of the light-emitting tube, resulting in a configuration is complicated.

Also, unless the camera lens and the light source are spaced more than several tens of centimeters apart from each other, the measurement accuracy will be poor because triangulation is used, and the camera would be considerably large even if an attempt is made to house them within the camera housing.

Also, it is impossible to calculate or measure the sizes or dimensions of an object that is image-picked up with a conventionally-known camera unless the distance to the object is known. Also, it has been impossible to know the sizes of the object from a color image that has been picked up.

Also, when an attempt is made to extract an object from an image picked up with a conventionally-known camera, an environment having a single color background is typically prepared in advance, resulting in a large-scale preparation.

Hereinafter, with reference to the drawings, a description is provided of a shape measuring camera and an object extracting camera capable of solving the above described deficiencies.

(Fourth Embodiment)

Figure 20:
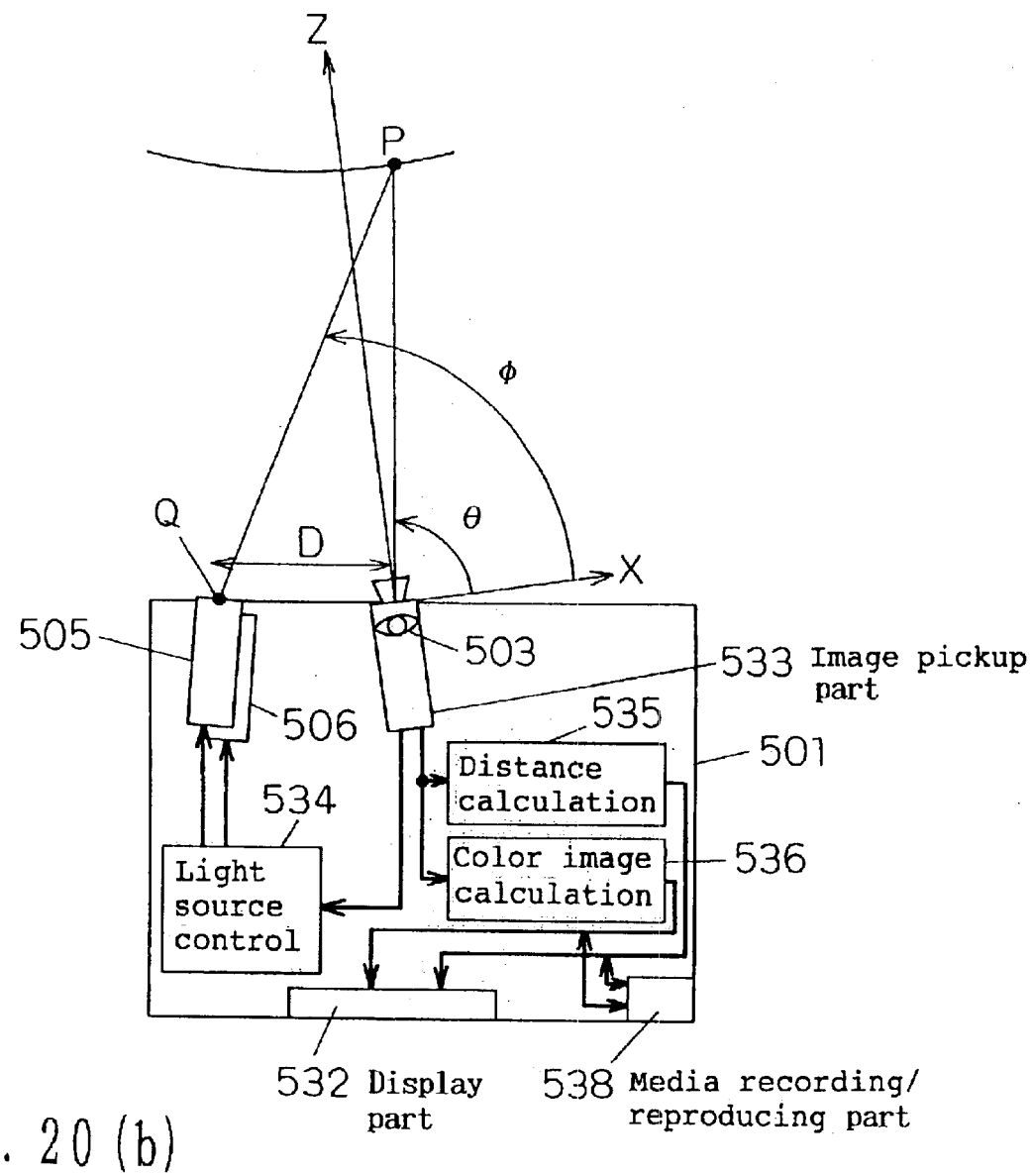
FIGS. 20(a) and (b) are block diagrams illustrating a camera according to the fourth embodiment of the present invention.
Figure 20:
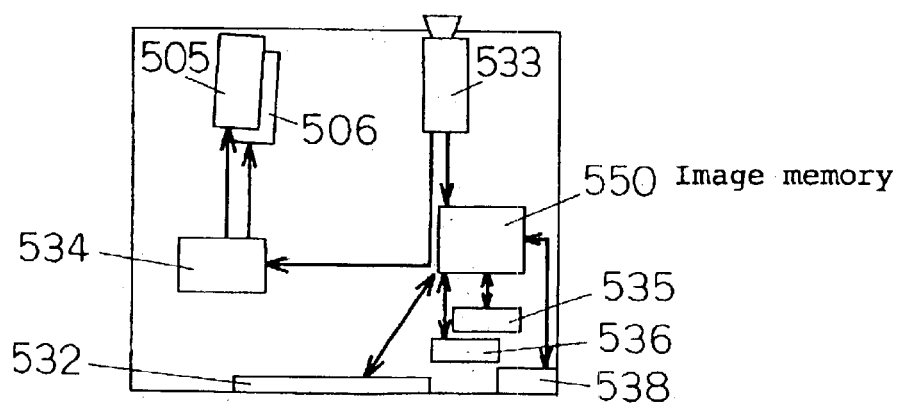

FIGS. 13(a) and 13(b) are diagrams illustrating a shape measuring camera and an object extracting camera according to a fourth embodiment of the present invention. FIG. 20 is a block diagram showing this camera.

Figure 13:
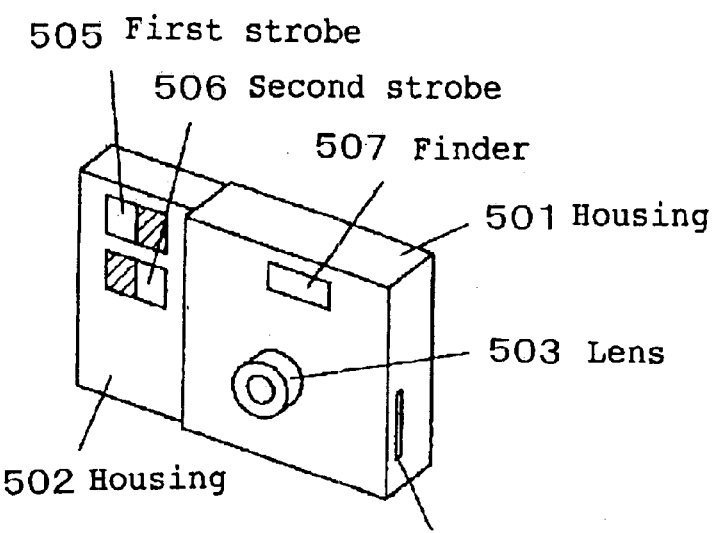
FIGS. 13(a) and (b) are perspective views of cameras useful for shape measurement and object extraction according to a fourth embodiment of the present invention.
Figure 13:
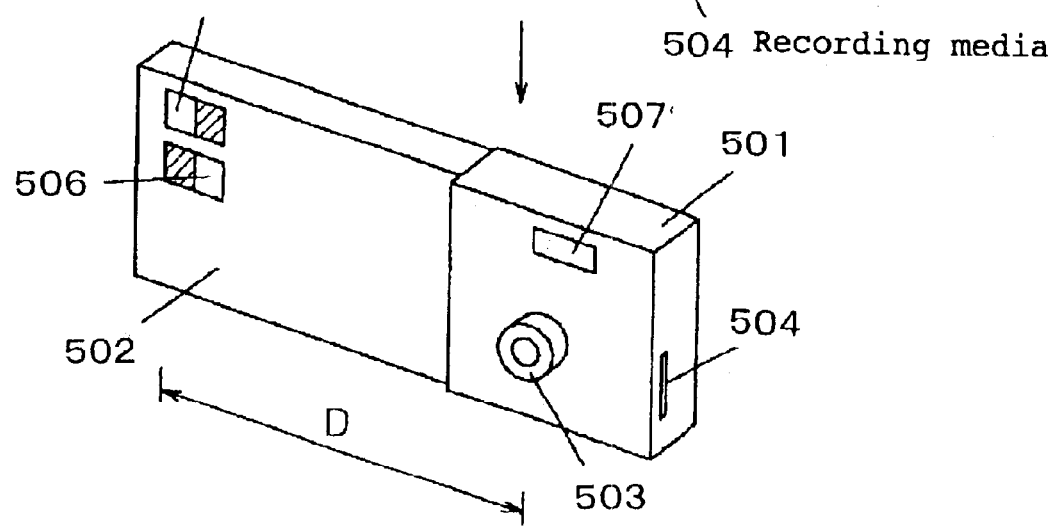
Figure 14:
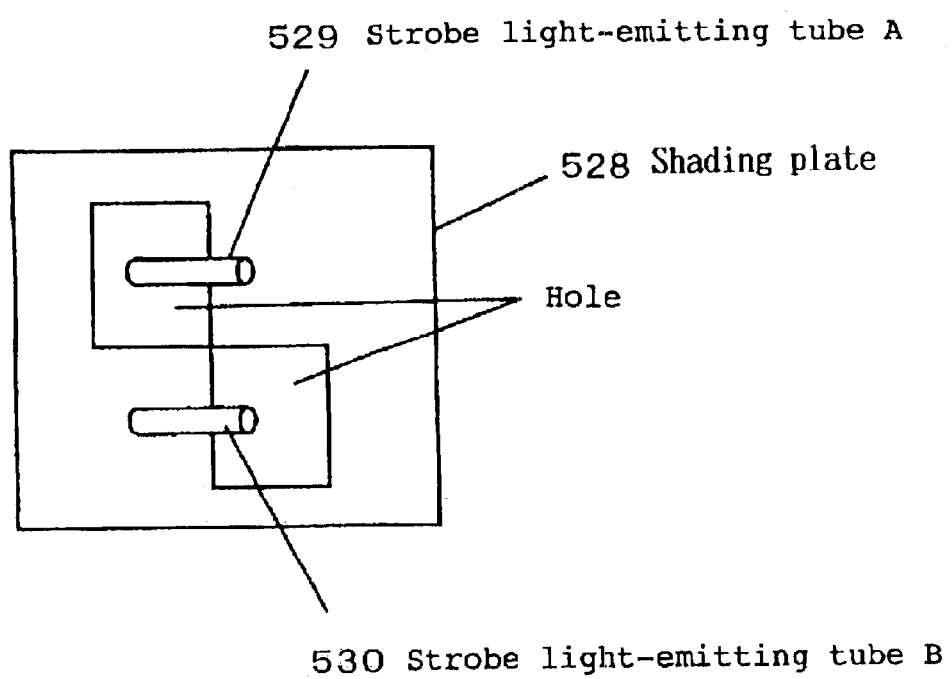
FIG. 14 is a block diagram illustrating the configuration of a light source part of a camera according to the fourth embodiment of the present invention.

In FIG. 13, the reference numerals 501 and 502 denote a camera housing; 503, a photographing lens; 504, recording media; 505 and 506, first and second strobes, each forming the light source part respectively; and 507, a finder.

In FIG. 20, the reference numeral 532 denotes a display part; 533, an image pickup part; 534, a light source control part; 535, a distance calculation part; 536, a color image calculation part; 538, a media recording/reproducing part; and 550, an image memory.

The shape measuring camera is configured such that a housing 501 containing the camera part and a housing 502 containing a light-emitting part have different thicknesses from each other and can therefore be fit into each other in an overlapped manner as shown in FIG. 13(a), and further that the state of FIG. 13(a) or the state of FIG. 13(b) can be selected by the sliding the housings 501 and 502 with respect to one another. As such, a small-sized camera is provided for carrying in FIG. 13(a), while the housing is extended for image-pickup as shown in FIG. 13(b). An interval D between the center of the lens 503 and the strobe 505, 506 in the light source part is set to be large during use of the camera. FIG. 20(a) shows a simple configuration that includes no image memory 550, and FIG. 20(b) shows a configuration that includes an image memory, capable of image-pick up and display at a high speed.

Figure 15:
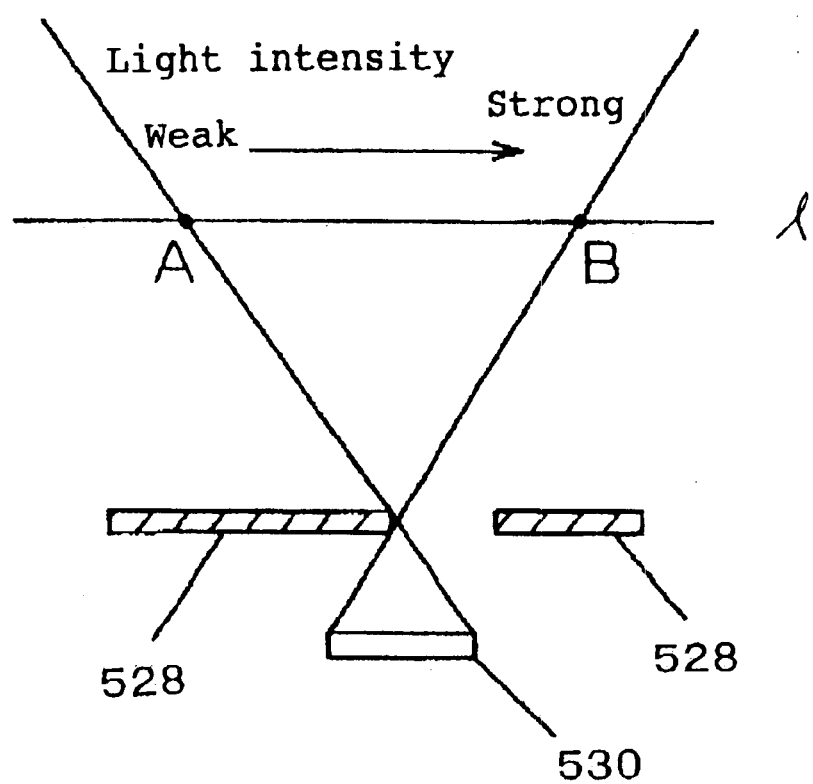
FIG. 15 is a view illustrating the principle of a light source part of a camera according to the fourth embodiment of the present invention.
Figure 16:
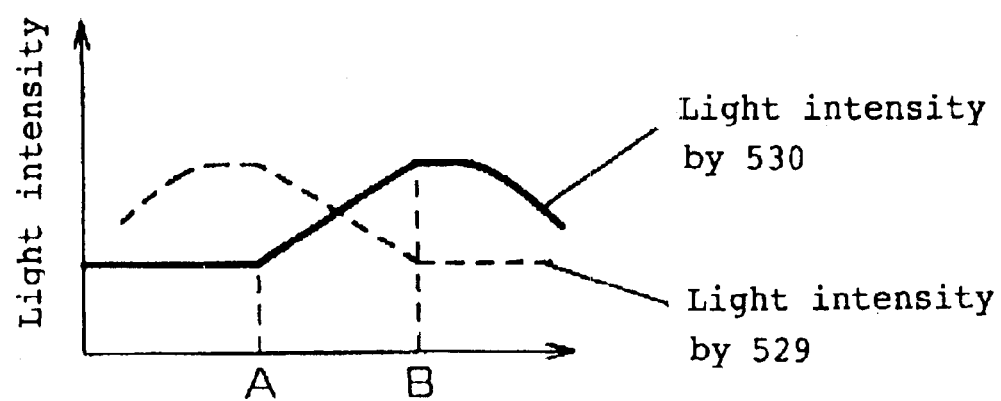
FIG. 16 is a view illustrating the light intensity of a light source part of a camera according to the fourth embodiment of the present invention.

The strobe 505, 506 in the light source part is constructed as shown in, for example, FIG. 2, and includes a strobe light-emitting tube 530 and a shading plate 528 having a hole with shifted center position. Light emitted from the segment of a light-emitting tube 530 is emitted while the path of intercepted light varies depending upon the position of a shading plate 528 as shown in the plan view of FIG. 15. The position of the hole in the shading plate 528 is deviated from the strobe light-emitting tube 530, and as such, light becomes increasingly more intense from point A toward point B. This generates a light pattern where the light intensity varies in opposite directions to each other from two strobe light-emitting tubes, as shown in FIG. 16. A description is now provided of a method of calculating a depth distance using such light. In this respect, the description is similar to the calculation method for depth distance already described.

Figure 17:
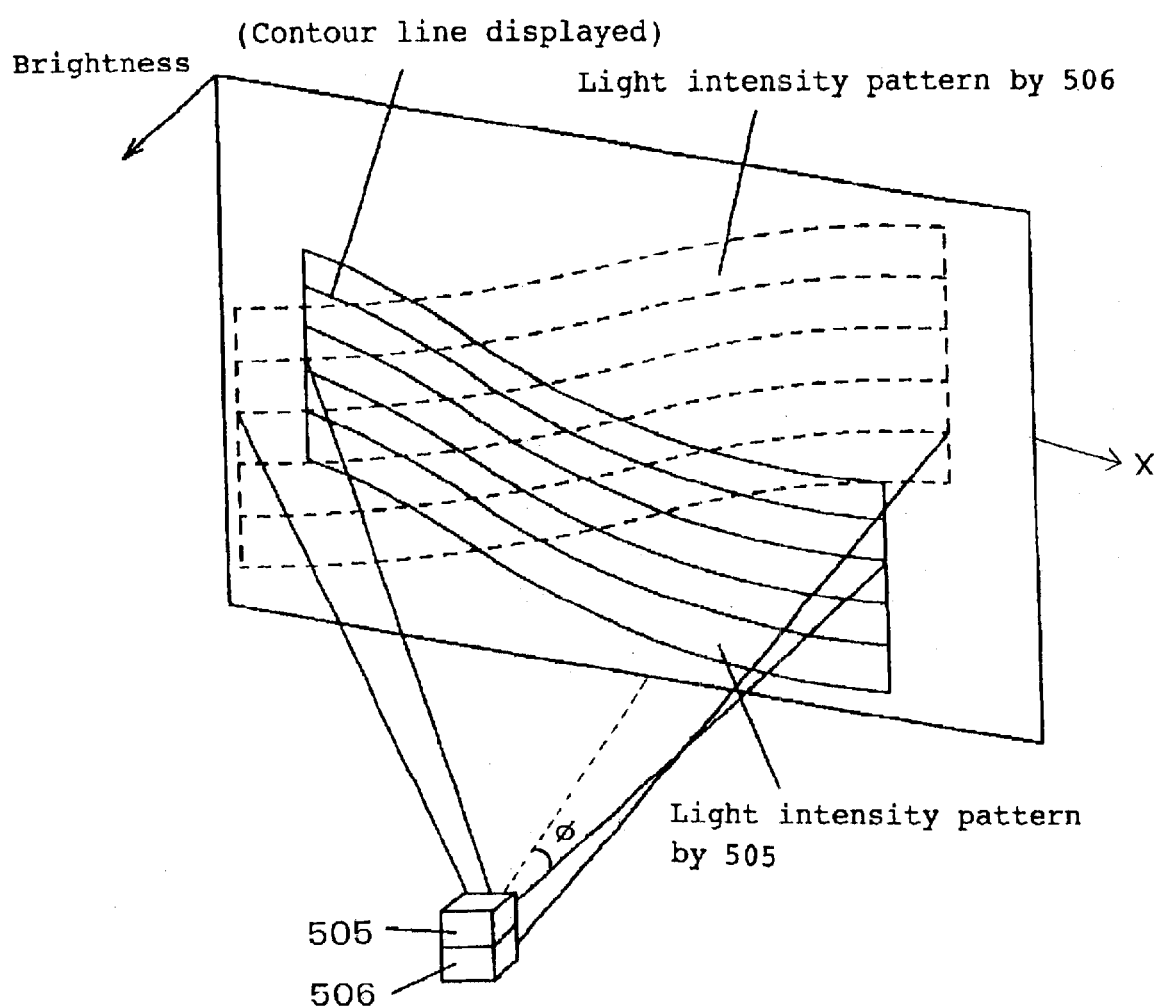
FIG. 17 is a view illustrating a light intensity pattern of a light source part of a camera according to the fourth embodiment of the present invention.
Figure 18:
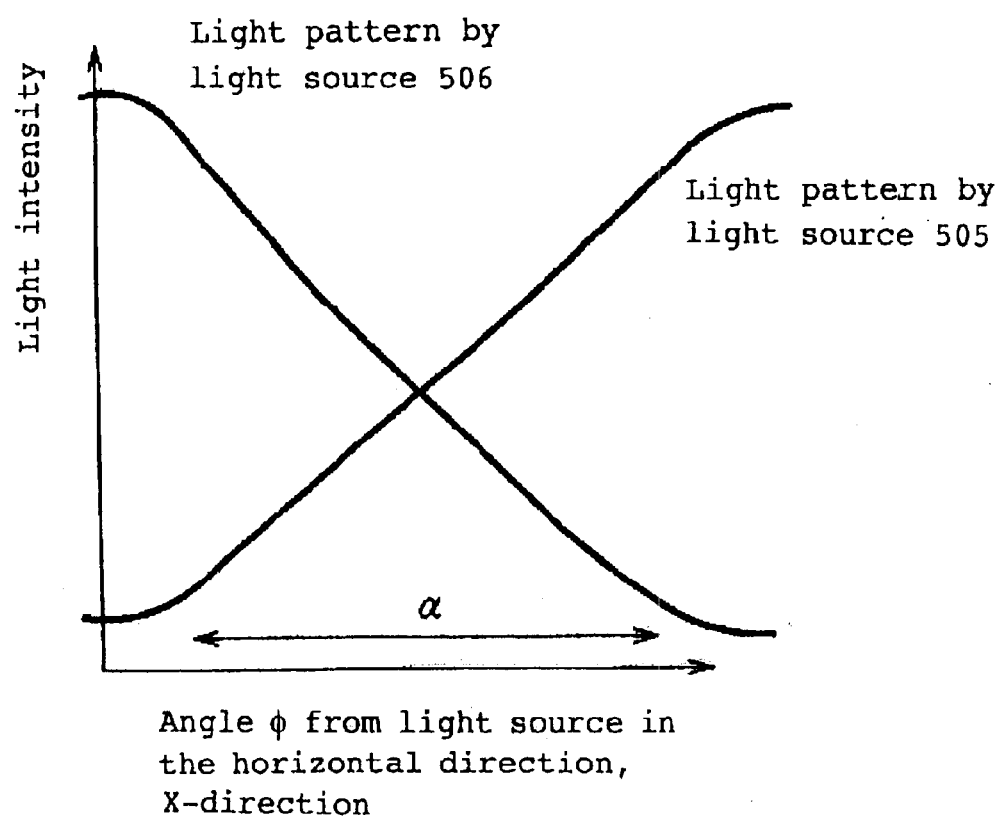
FIG. 18 is a view illustrating a light intensity pattern of a light source part of a camera according to the fourth embodiment of the present invention.

A light pattern thus obtained is a pattern in which the light intensity varies as shown in FIG. 17. FIG. 18 illustrates the variations in the light intensity in the horizontal X-direction (one dimension). In the α portion of this light pattern, light to be irradiated from the two light sources into the object space becomes bright on the right side in one and bright on the left side in the other, as viewed from each light source. This pattern varies, however, also in the height-wise direction (Y direction).

Figure 19:
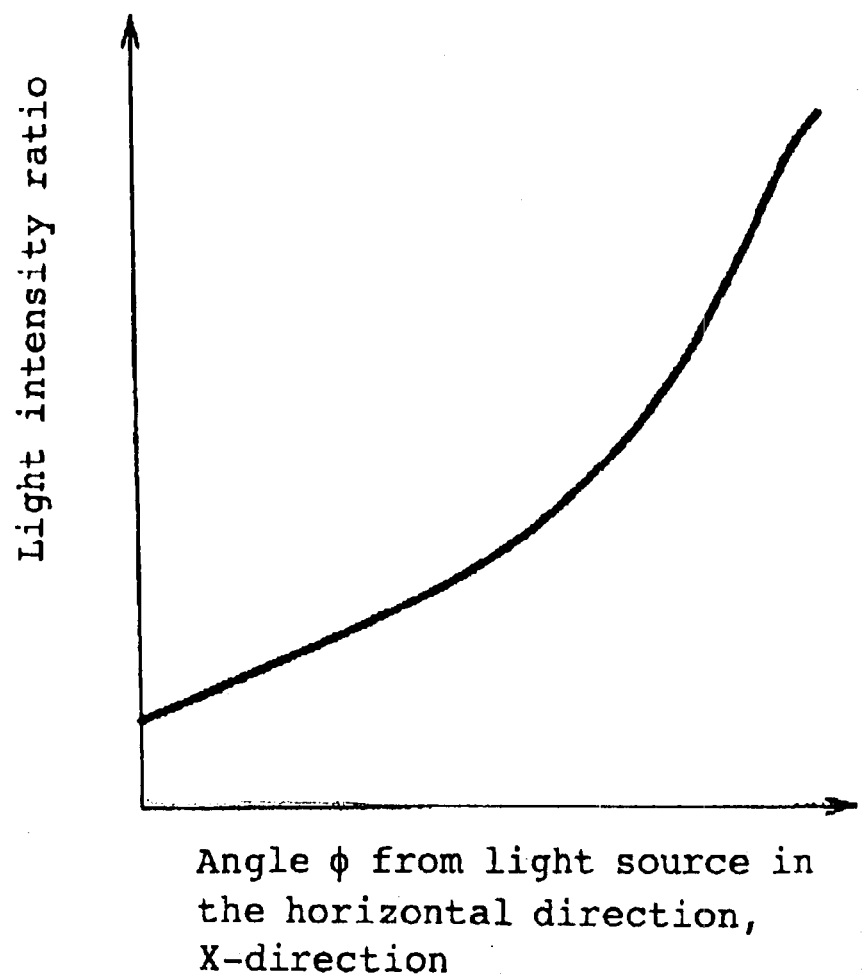
FIG. 19 is a view illustrating a light intensity ratio of a light source part of a camera according to the fourth embodiment of the present invention.

FIG. 19 shows the relationship between the light intensity ratio and an angle φ from the light source in the horizontal direction in the object illumination by the above-described two projected light in the a portion of FIG. 18. In the α portion, the relationship between the light intensity ratio and the angle φ from the light source in the horizontal direction is a one-to-one correspondence. In order to measure a distance, it is desirable to alternately project two types of light patterns onto a plane which has been set up vertically in advance, and to obtain in advance data on the relationship between the light intensity ratio and the position from the light source in the horizontal direction as shown in FIG. 17 for each Y-coordinate, from the result obtained by image-picking up the reflected light with the camera 501.

Also, if the light sources are located such that a segment between the lens center of the camera 501 and the light source runs horizontal to the X-axis of the image pickup surface, the distance can be accurately calculated through the use of data on the relationship between a light intensity ratio determined for each Y-coordinate and positions from the light sources in the horizontal direction. This is calculated by the distance calculation part illustrated in FIG. 20(a). Hereinafter, a description is provided of a distance calculation method using the light intensity ratio.

In the case where a point P in FIG. 20(a) is set to an attention point, when two types of light patterns from respective strobes 505 and 506 in the light source concerning the point P on an image picked up by the image pickup part 533 are projected by the light source control part 534 on a time-shared basis, an angle φ of the point P as viewed from the light source is measured through the use of a luminance ratio obtained from the image pickup data, which is the output from the image pickup part 533, and the relationship of FIG. 19 corresponds to the Y-coordinate value of the point P.

In this respect, the assumption is made that the relationship of FIG. 19 has characteristic properties that differ depending upon the Y-coordinate value, and that the relationship between the light intensity ratio and the angle φ from the light source in the horizontal direction has been prepared for each Y-coordinate by measurement in advance. Also, an angle θ with respect to the point P as viewed from the camera is determined from the position (that is, pixel coordinate value of point P) in the image, and a camera parameter (focal length, optical center position of lens system). Thus, the distance is calculated from the above-described two angles and the distance (base length D) between the light source position and the optical center position of the camera, in accordance with the principle of triangulation.

Assuming that the optical center of the camera is the origin, and setting the optical axis direction of the camera as the Z-axis, the horizontal direction as the X-axis, the vertical direction as the Y-axis, and assuming an angle, made by the X-axis, of the direction of the attention point as viewed from the light source to be φ, an angle, made by the X-axis, of the direction of the attention point as viewed from the camera to be θ, and the light source position to be (0, −D), that is, the base length to be D, then the depth value Z of the attention point P can be calculated using the following formula:

$$Z = D \tan\theta \tan\phi / (\tan\theta - \tan\phi)$$

When the value of D (distance between lens and light source part) is small the accuracy of the depth value Z measured is degraded. If the D value is set to 20 to 30 cm for an object up to a distance of, for example, about 3 m, the depth can be measured with an error of plus or minus about 1% of the measured distance. As the D value becomes smaller than 20 to 30 cm, the measurement error increases. Also, the X and Y coordinates of the attention point P are given by the following formulas:

$$X = Z/\tan\theta$$

$$Y = Z/\tan\omega$$

Also, a color image calculation part 536 calculates an image obtained by adding and averaging image pickup data when the above-described two types of light patterns are irradiated to make the image into a color image. These two types of light patterns have characteristic properties such that the brightness varies complementally to each other as shown in FIG. 18, and by adding and averaging them, the same color image as a color image obtained by picking up with strobes with uniform brightness can be obtained.

The color image and depth image which have been thus obtained are displayed on a display part 532, and are recorded in recording media 504 through a media recording/reproducing part 538. Of course, the color image and depth image which have been once recorded can also be read out by the media recording/reproducing part 538 to be displayed on the display part 532.

If the image data from the image pickup part 533 is accumulated in an image memory 550 as shown in FIG. 20(b), the image can be continuously input. Also, a plurality of images recorded on the recording media 504 can be read out on the image memory 550 to be reproduced and displayed at a high speed.

According to the present embodiment as described above, it is possible to generate a plurality of light patterns in a single configuration, and to realize a shape measuring camera with a stable configuration through the use of a straight-line shaped strobe light-emitting tube and a shading plate with a hole for a light intensity change pattern.

Also, it is possible to realize a shape measuring camera capable of taking a large interval D between the lens 503 and the strobes 505 and 506 in the light source part and making it small during non-use (e.g., carrying the camera), and by extending the main body during image-picking up, and capable of measuring a depth image with high accuracy.

(Fifth Embodiment)

Figure 28:
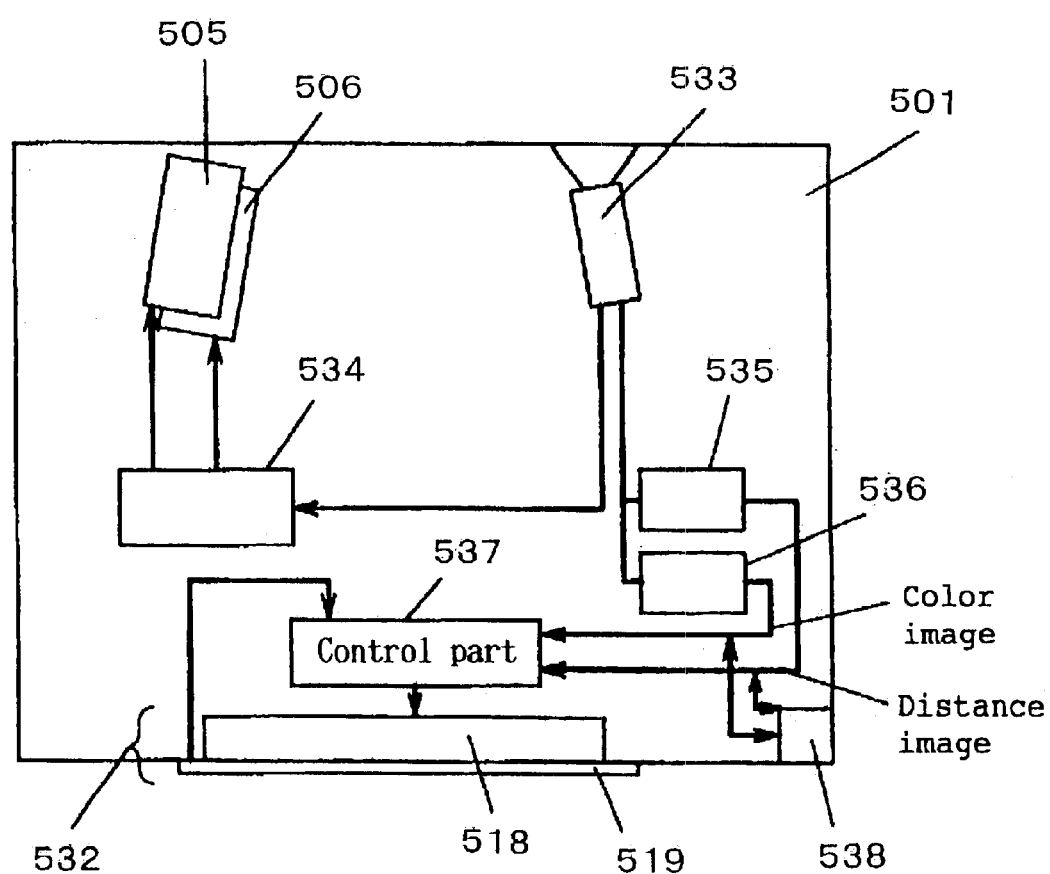
FIG. 28 is a block diagram illustrating a camera according to the fifth embodiment of the present invention.

FIG. 28 is a block diagram showing a shape measuring camera and an object extracting camera according to a fifth embodiment of the present invention. In FIG. 28, the reference numeral 501 refers to a camera housing; 505 and 506, first and second strobes, each forming the light source part respectively; 518, a display panel; 519, a touch panel; 532, a display part; 533, an image pickup part; 535, a distance calculation part; 536, a color image calculation part; 538, a media recording/reproducing part; and 537, a control part. Hereinafter, the description will be made of the operation of the shape measuring camera and the object extracting camera having the above-described configuration.

Figure 27:
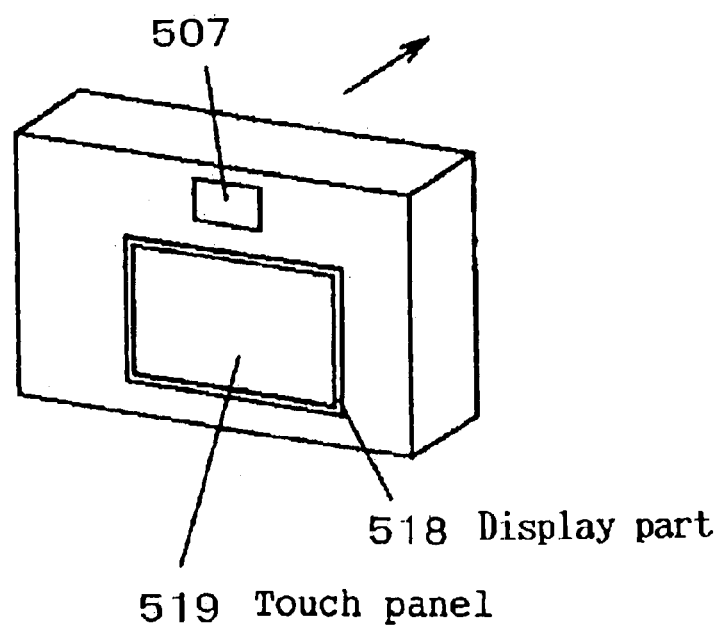
FIG. 27 is a rear perspective drawing illustrating a camera according to the fifth embodiment of the present invention.

FIG. 27 shows the back of the shape measuring camera. On the back, the display panel 518 and the touch panel 519 in the same position to display a color image or a depth image which has been picked up, and are configured such that the user can denote the attention position (coordinate) in the image using a finger or a rod-shaped object.

FIG. 28 is a block diagram useful for describing a display and distance measurement apparatus and process. A distance image and a color image which have been picked up are input into the control part 537, and the user's attention position designating coordinates are also input into the control part 537. The control part 537 displays a color image picked up on the display panel 518 and calculates an actual distance and the like from a plurality of attention designating coordinates input by the touch panel 519 and a depth image to display on the display panel 518.

Figure 25:
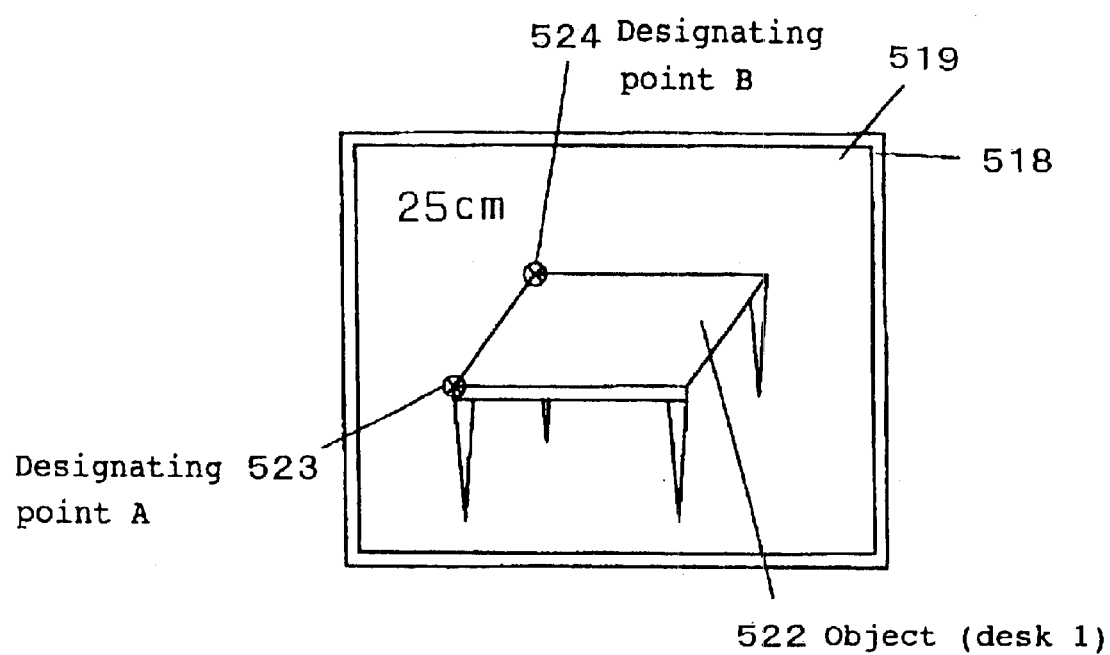
FIG. 25 is a view illustrating a display method of a camera according to a fifth embodiment of the present invention.

FIG. 25 illustrates an aspect of attention position designation. First, it is assumed that a color image for a desk picked up by the user is displayed on the display part 518. The user denotes designation points A523 and B524 using a finger or a rod-like object.

When the points are denoted, the shape measuring camera calculates the distance Lab of a segment AB between points A and B, that is, $$Lab=\sqrt{\{(Xa-xb)^2+(Ya-Yb)^2+(za-zb)^2\}}$$

using the values of actual coordinates A (Xa, Ya, Za) and B (Xb, Yb, Zb) of respective coordinate positions of the depth image obtained to be displayed in another portion of display panel 518. In this example, the displayed length of AB is 25 cm. In this manner, the user can measure a distance between points, of the object image-picked up without touching it even if it is a distance in the depth-wise direction.

Figure 26:
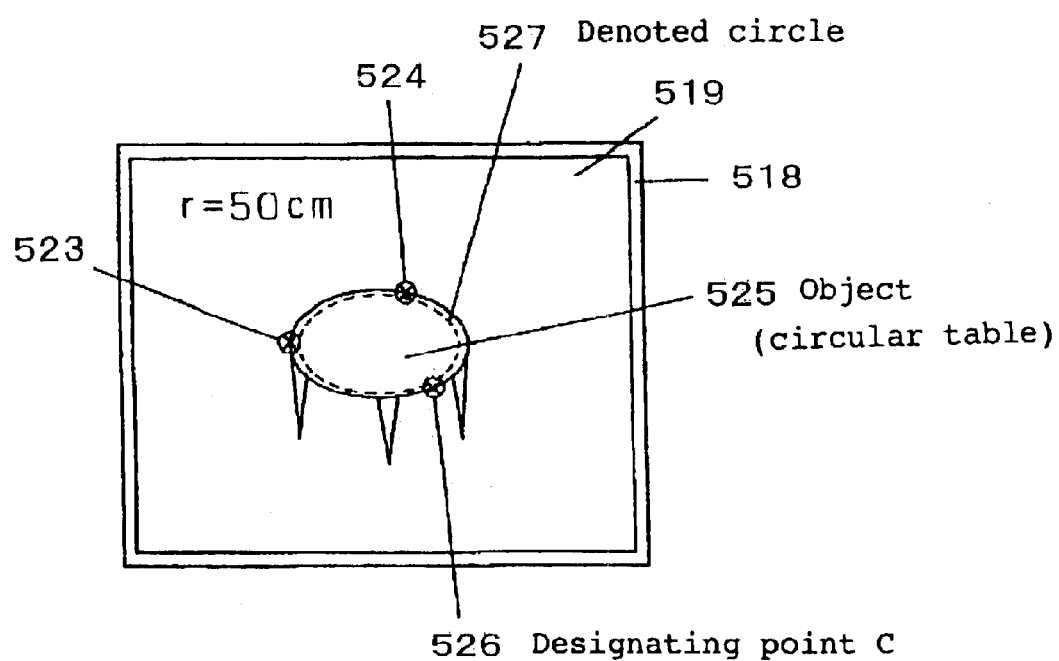
FIG. 26 is a view illustrating a display method of a camera according to the fifth embodiment of the present invention.

Also, the size of a circular object (not a straight line-shaped object) can be measured in a similar manner. FIG. 26 illustrates a circular table that has been image-picked up. For example, while viewing a color image which has been image-picked up and displayed on the display panel 518, the user denotes three points, A523, B524 and C526 on a circumferential portion of a circle to be measured by touching the points on the touch panel using the finger or a rod-shaped object.

Thereafter, the shape measuring camera determines, from space coordinate values A (Xa, Ya, Za), B (Xb, Yb, Zb) and C (Xc, Yc, Zc) for these three points, a formula for a circle which passes through these points. Although there are various methods for determining it, for example, perpendicular bisectors for segments AB and BC may be determined and their point of intersection is assumed to be the center G (Xg, Yg, Zg) of the circle. Next, a mean value of the length of segments GA, GB and GC can be made into the radius of the circle.

The radius thus obtained is displayed to be 50 cm in FIG. 26, of which the user is notified. By doing so, the size of such a complicated shape as a circle can also be measured without touching the object. In addition, for any shape having a mathematical expression for defining the shape such as an equilateral triangle and an ellipse, its size can be measured from the depth image without touching the object by the user designating a plurality of points. Also, in this case, the user has input the coordinates for the attention point by using the touch panel, however, it may be possible to display a cursor (such as a figure of cross), which moves left, right, up or down, on the display panel 518, and to denote points by moving the cursor position with a push-button to input the coordinates for the attention point.

If the size calculation result for the object is recorded in the recording media 504 through the media recording/reproducing part 538, it is not necessary for the user to remember the measurement, because the measurement result can be fetched from the recording media 504, and can be conveniently used by equipment (such as a personal computer) capable of reading and writing the measurement result. Of course, the measurement result may be superimposed on the color image picked up to be preserved as an image.

In the foregoing example, the length of the object has been measured, and it is also possible to measure a plurality of lengths to determine the area or volume.

Further, another example of display and utilization of the pickup data will be described.

As shown in FIG. 27, on the back of the camera, the display part 518 and the touch panel 519 are in the same position to display a color image or a depth image which has been picked up, and are configured such that the user can denote the attention position (coordinate) in the image using a finger or a rod-shaped object. Using this device, it is possible to realize an object extracting camera capable of obtaining an image by extracting an object on which a user focuses their attention.

FIG. 28 is a block diagram illustrating the display/extracting operation, where the object extracting camera has a similar configuration to the above-described shape measuring camera. A distance image and a color image which have been picked up are input into the control part 537, and a user's attention position designation coordinates are also input into the control part 537.

The control part 537 can display a color image picked up on the display panel 518 and extract an object at which the user aims from a plurality of attention designating coordinates input by the touch panel 519 and a depth image to display on the display panel 518 for recording in the recording media 504.

Figure 29:
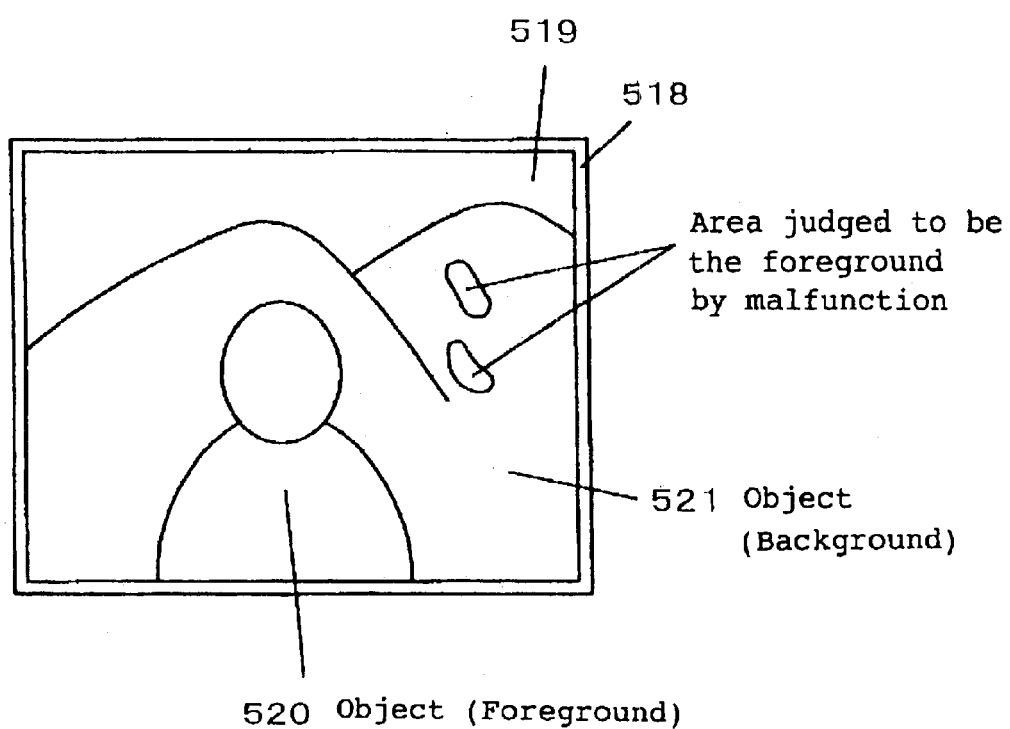
FIG. 29 is a view illustrating an image correcting operation of a camera according to the fifth embodiment of the present invention.

With reference to FIG. 29, the description will be made of this operation.

First, the assumption is made that the user wishes to extract an object 520. The user denotes a portion of the object 520 on the touch panel 519. The control part 537 obtains the depth value of a portion including by this coordinate from the depth image, judges a portion having a depth continuously connected therewith as an object, at which the user aims, and fills any other portions with a certain specific color for displaying on the display panel 518.

Regarding the judgment of such a connected portion, image processing can be performed with a denoted coordinate as a starting point, and the area will be expanded left, right, up or down as far as the depth value continuously varies and if there is any discontinuous portion in depth, the expansion of the area will be stopped. A little longer distance than a distance between an object which the user wishes to extract and the camera, or a range of such a distance that the user wishes to extract is denoted using the touch panel or the push-button. The control part 537 displays a portion of a color image having a closer value than a distance denoted by the value, or a color image included only in a portion within a range of the denoted distance, while the other portions are filled in with a certain color. Thus, they are displayed on the display panel 518, and are recorded in the recording media 504.

Figure 30:
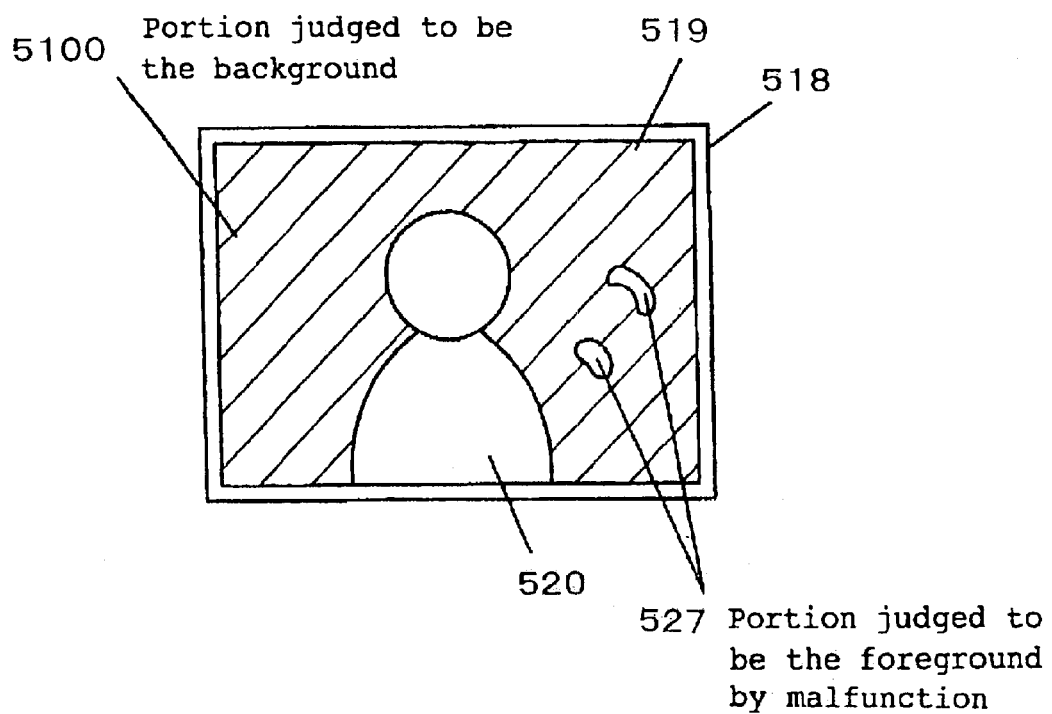
FIG. 30 is a view illustrating an image correcting operation of a camera according to the fifth embodiment of the present invention.

In this manner, the camera is capable of judging the object at which the user aims, for extracting the object to be displayed and recorded. In this case, depending upon the image processing, a portion may be erroneously judged to be a foreground (instead of background) by a malfunction as shown in FIG. 30.

In this case, if the user denotes the erroneous portion (FIG. 29), using the touch panel 519 and corrects the display result so that the portion is part of the background, it will be possible to obtain a high-quality extracted color image for the object. In this case, the user may denote the portion which has been erroneously judged to be the background to perform a correcting operation so that this portion becomes a foreground.

By extracting a color image according to the distance using the information on the depth image as described above, it is possible to easily obtain an image by extracting an object at which the user aims.

Also, in FIG. 28, an image memory is arranged within the control part 537, and an image to be reproduced and used is placed in the image memory, whereby it is also possible to make the access speed for the images faster, or to switch a plurality of images to high speed for display and operation.

Figure 21:
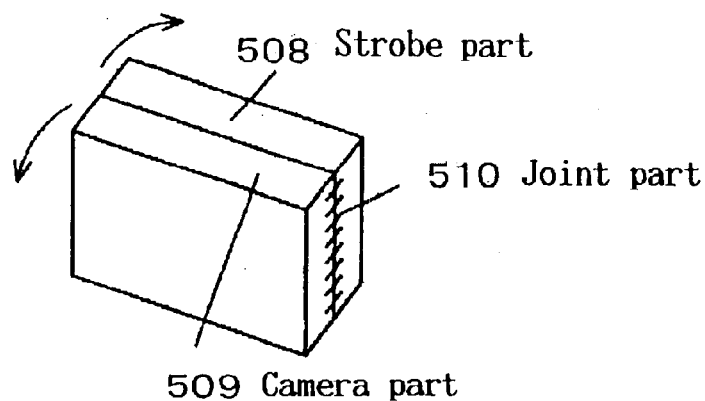
FIGS. 21(a) to (d) are block diagrams illustrating a camera according to the fourth embodiment of the present invention.
Figure 21:
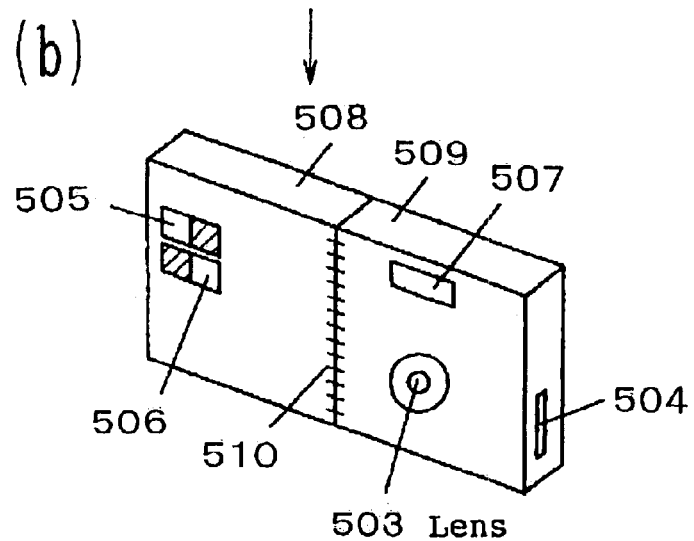
Figure 21:
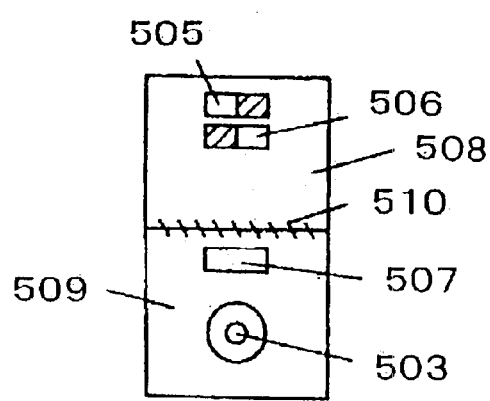
Figure 21:
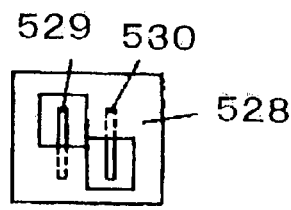

According to the present embodiment as described above, it is also possible to measure an actual size of an object without touching it. Also, it is possible to realize a shape measuring camera and an object extracting camera capable of easily extracting an object at which the user aims, on the basis of its depth information. In the fourth embodiment, a similar effect can be obtained even if the housing for the shape measuring camera is constructed as shown in FIG. 21. More specifically, the configuration is arranged such that a camera part 509 containing an image pickup part 533 and a strobe part 508 containing first and second strobes 505 and 506 forming a light source are connected together by a joint 510 having a hinge-like configuration in such a manner that the user can freely fold and extend the camera as shown in FIG. 21(a) and FIG. 21(b). The camera housing is small-sized in the state shown in FIG. 21(a) (e.g., when carrying the camera), and during image-pick up, if it is extended as shown in FIG. 21(b), the interval D between the lens 503 and the first and second strobes 505 and 506 in the light source can be made larger.

Also, the configuration can be arranged such that the lens and the first and second strobes 505 and 506 are vertically arranged as shown in FIG. 21(c). In this case, in the depth image calculation, as opposed to the angles φ and θ relating to changes in the horizontal direction as described in the foregoing, the changes are only performed in the vertical direction, and the depth image can be calculated by a similar calculation for the other directions. In order to cause changes in the light intensity in the vertical direction, the light source is configured by vertically-laid light-emitting tubes as shown in FIG. 21(d).

In this case, even if the configuration is arranged such that a housing 501 containing a camera part as shown in FIG. 21 and a housing 502 containing a light-emitting part have different thicknesses and can be fit into each other in a superimposed manner in a vertical direction as shown in FIG. 23, a similar effect can be obtained.

In the fourth embodiment, a similar effect can be obtained even if the housing for a shape measuring camera is constructed as shown in FIG. 22. More specifically, the housing 517, that contains the first and second strobes 505 and 506 in the light source part, is made small in size, and is connected to the camera housing 501 using a hinge configuration. During use, the housing 517 is turned by the user to thereby expose the first and second strobes 505 and 506 in the light source part, where normally the housing is small in size while the first and second strobes 505 and 506 in the light source part are not exposed (preventing them from being damaged due to any careless contact), and at the same time, during image-picking up, the interval D between these strobes and the lens can be enlarged.

In the fourth embodiment, although the light source is constructed as shown in FIG. 2, even if the configuration is arranged such that there is one light-emitting tube 529 and a liquid crystal barrier 531 placed in front thereof as shown in FIG. 24(a), it is possible to have a similar light pattern generating function.

In this case, if each light transmittance portion is sequentially provided on the left side of the light-emitting tube 529 as shown in FIG. 24(b) and provided on the right-side thereof as shown in FIG. 24(c) in such a manner that the light-emitting tube 529 sequentially emits light one at a time in the respective states, then the same light pattern as shown in FIG. 18 can be generated by sequentially causing one light-emitting tube to emit light twice without using two light-emitting tubes as shown in FIG. 2.

This enables a small number of light-emitting tubes to emit light as if light were emitted from the same position instead of light-emitting patterns being emitted from positions vertically deviated as shown in FIG. 2, and any measurement error in depth can be reduced.

This is because in FIG. 20, the position of an emitting point Q of the light pattern is deviated in the perpendicular direction in the present embodiment, whereas in this case, it is at the same position, and therefore a straight line PQ becomes a line, and less errors occur than in the depth calculation using a straight line having different vertical positions.

Also, in this case, the entire surface of a liquid crystal barrier 531 is placed in a light transmitted state as shown in FIG. 24(d), whereby it can be utilized as a strobe for the camera to pick up a normal two-dimensional image.

Figure 31:
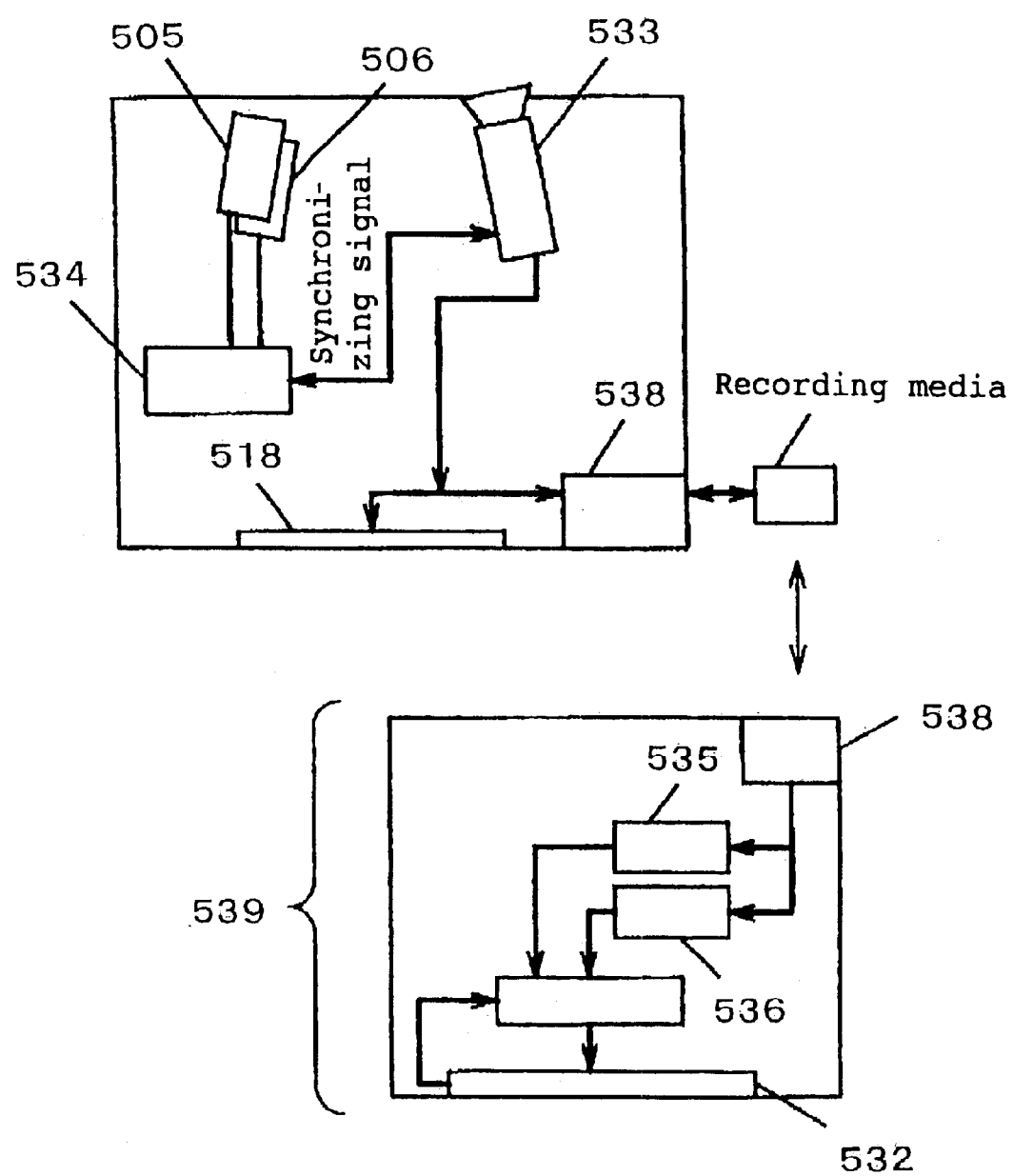
FIG. 31 is another block diagram illustrating a camera according to the fourth embodiment of the present invention.

Also, according to the fourth embodiment, in the main bodies of the shape measuring camera and object extracting camera, the depth image and color image are calculated and then recorded in the recording media. As shown in FIG. 31, in the main body of the camera, image data picked up in synchronism with the first and second strobes 505 and 506 in the light source is recorded in the recording media 504 through the media recording/reproducing part 538, and the image data is read out by an analysis device 39 configured by a personal computer or the like to obtain a desired analysis result by the distance calculation part 535 and the color image calculation part 536. Thus, the object may be extracted or the shape may be measured using the display part 532.

The image data can also be transferred to the analysis device 539, and not through the recording media 504. For example, the camera body and the analysis device 539 are connected together using existing data communication means. The data communication means may be, for example, wire communications such as a parallel data interface, serial data interface and telephone circuits. The data communication means may also be radio communication, optical communication, infrared-ray communication, portable telephone network communication and radio wave communication. Further, the analysis result can be recorded in the recording medium.

In this case, the image pickup part 533 is a moving image pick up video camera, and when the recording media 504 is a recording medium such as tape, it is normally utilized as a camera for picking up a color moving image. If the user lights a flash by pressing the push-button only when necessary and such an index signal as to allow only a video (such as a frame and a field), the portion to be distinguished is stored in a recording medium in advance, and the analysis device 539 is capable of extracting only an image for a portion having an index signal and calculating the color image and depth image only for the portion for output.

Also, in the fourth embodiment, the camera housing 501 has been provided with the light source part, however, in an alternative embodiment of the present invention includes a method to make only the light source part removable such that it is small in size and easily-portable during normal color image picking up and that the light source part is mounted for use only during depth image picking up.

Figure 24:
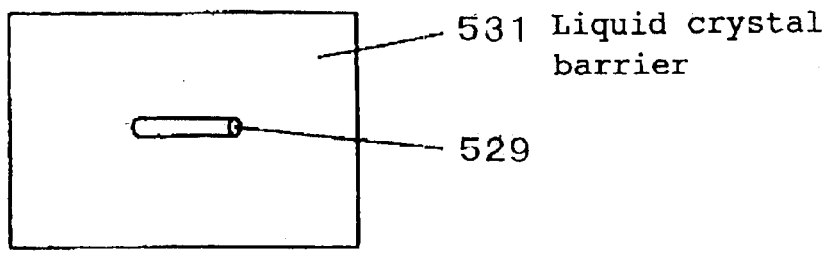
FIGS. 24(a) to (d) are block diagrams illustrating a light source part of the camera according to the fourth embodiment of the present invention.
Figure 24:
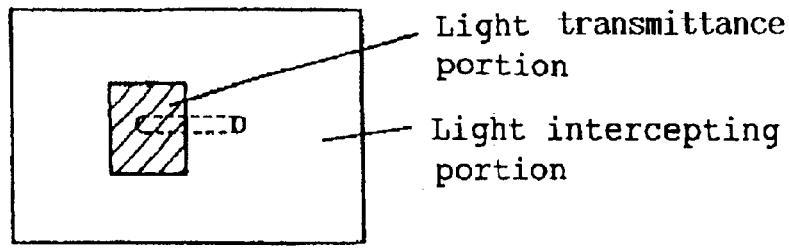
Figure 24:
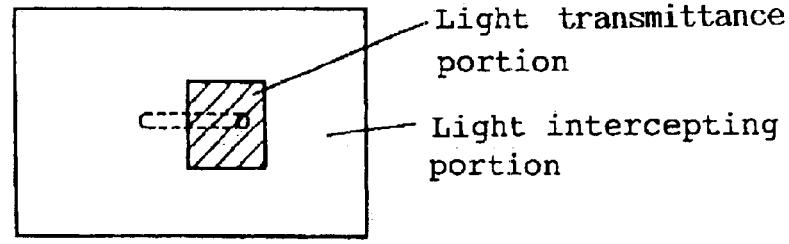
Figure 24:
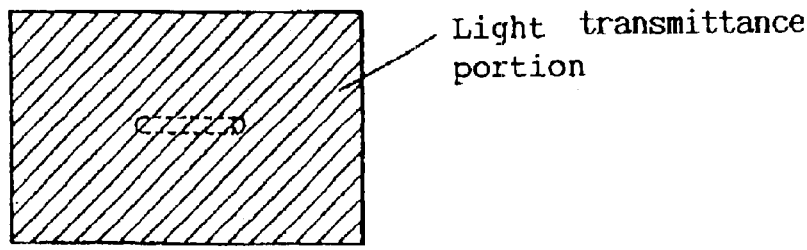
Figure 35:
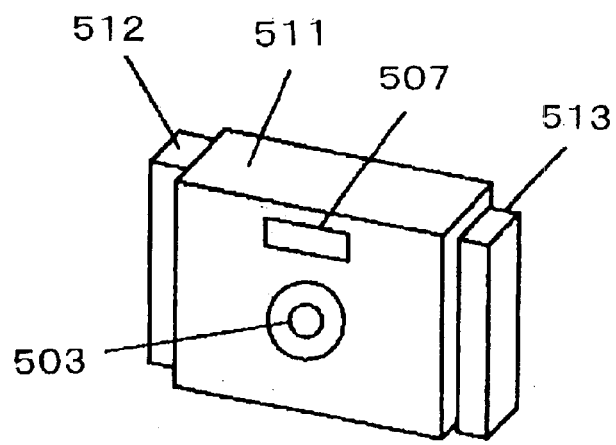
FIGS. 35(a) and (b) are illustrations of a camera according to the fourth and fifth embodiments of the present invention.
Figure 35:
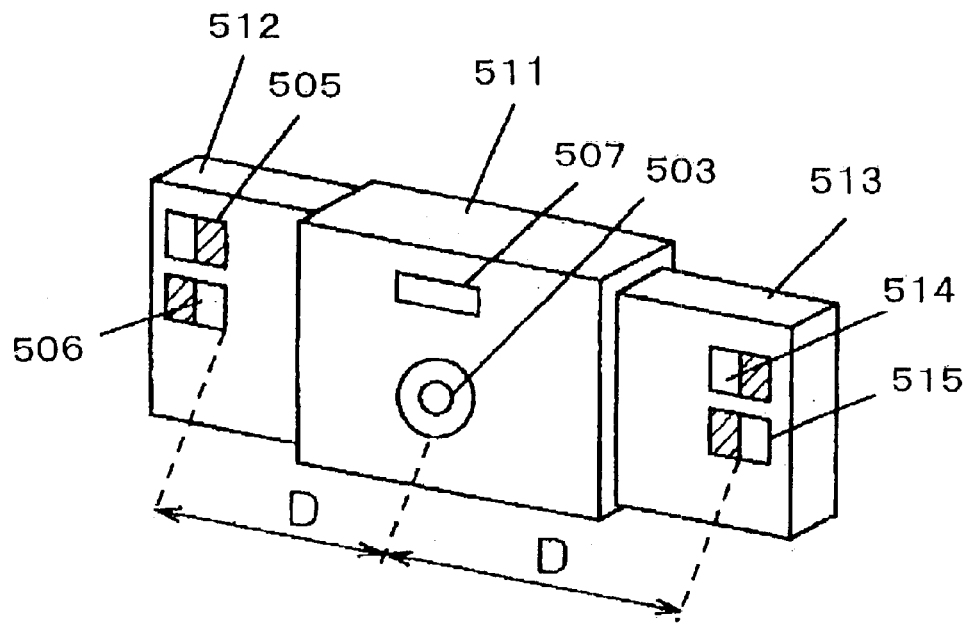
Figure 36:
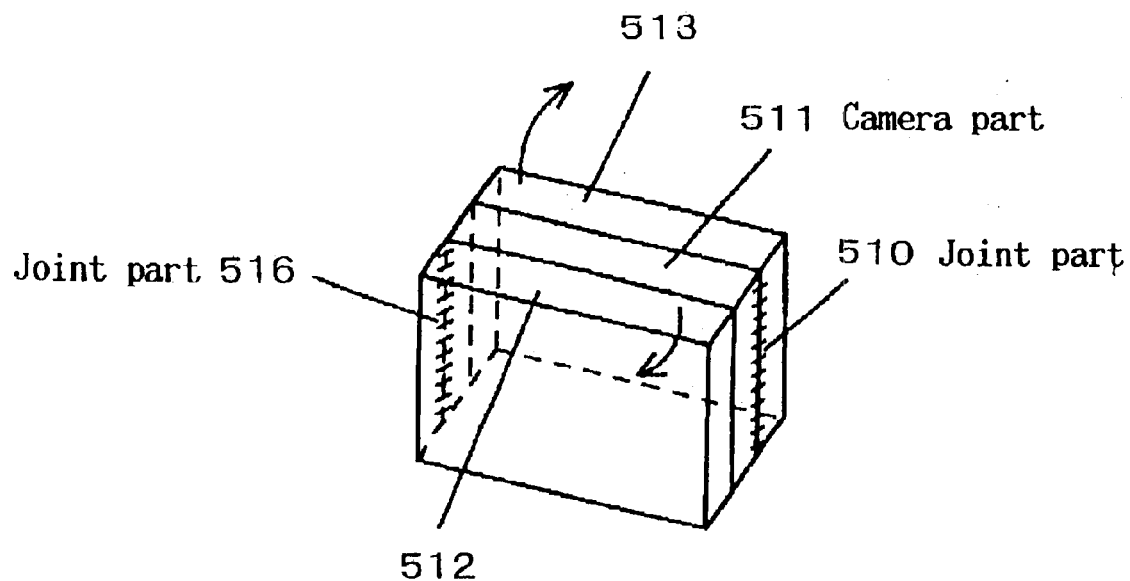
FIGS. 36(a) and (b) are additional illustrations of a camera according to the fourth and fifth embodiments of the present invention.
Figure 36:
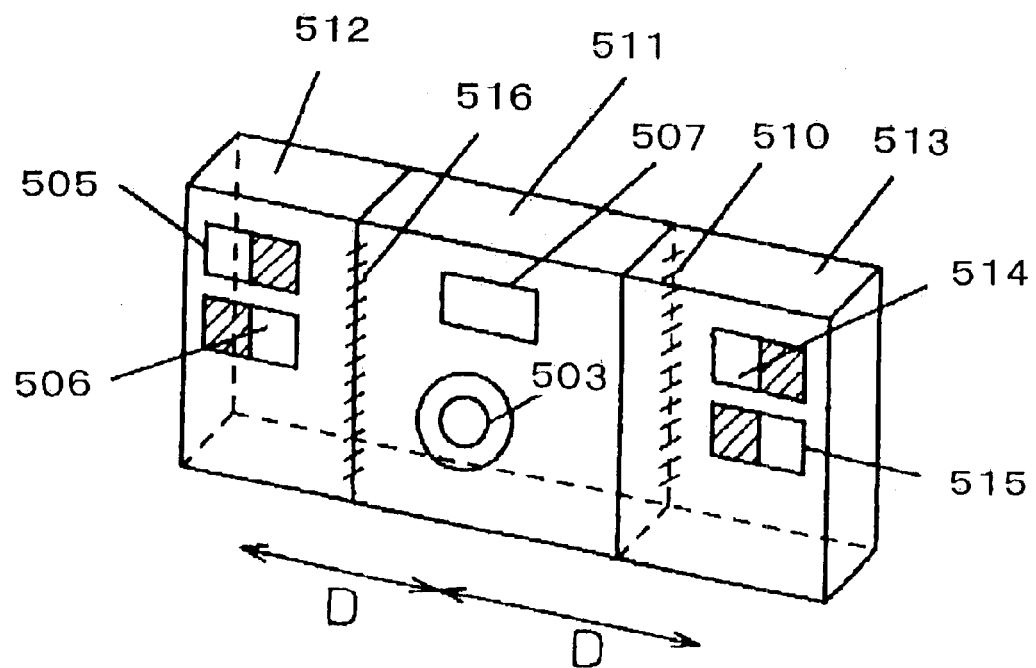
Figure 37:
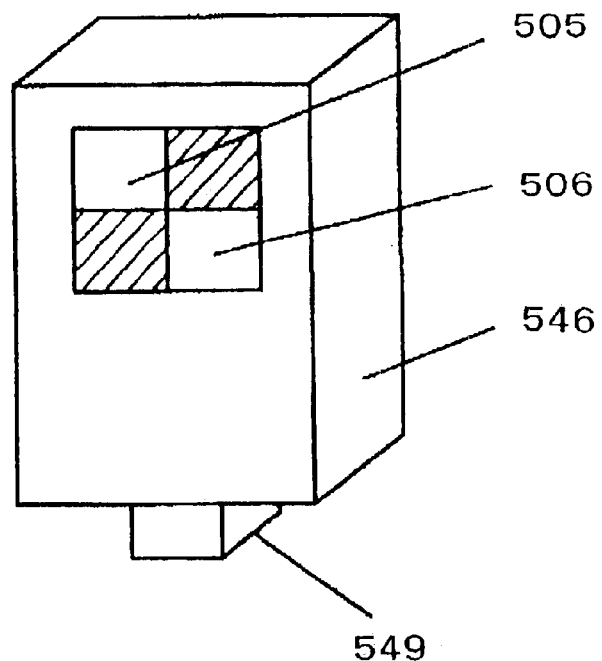
FIGS. 37(a) and (b) are illustrations of an external light source part in a camera according to the fourth and fifth embodiments of the present invention.
Figure 37:
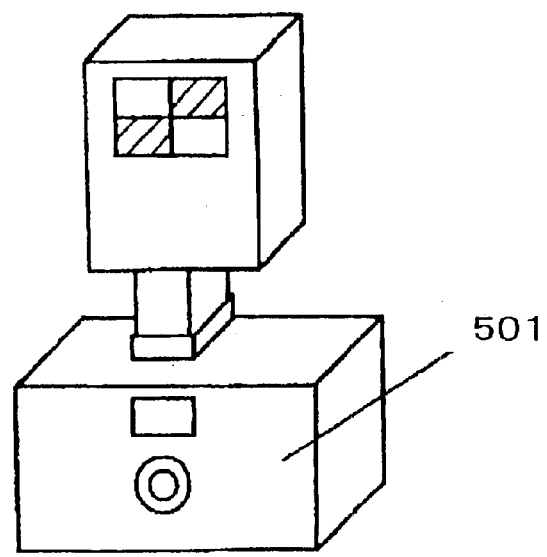
Figure 38:
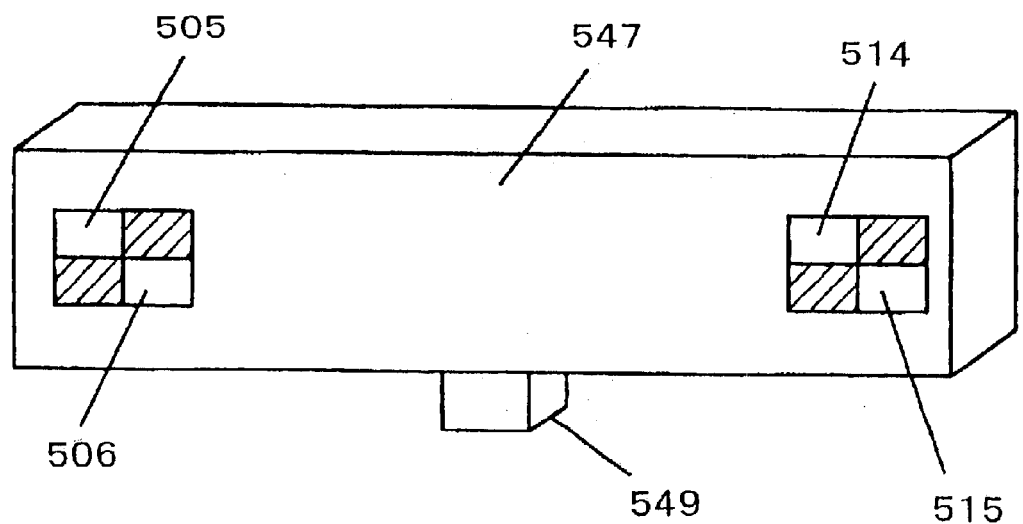
FIGS. 38(a) and (b) illustrate an external light source part in a camera according to the fourth and fifth embodiments of the present invention.
Figure 38:
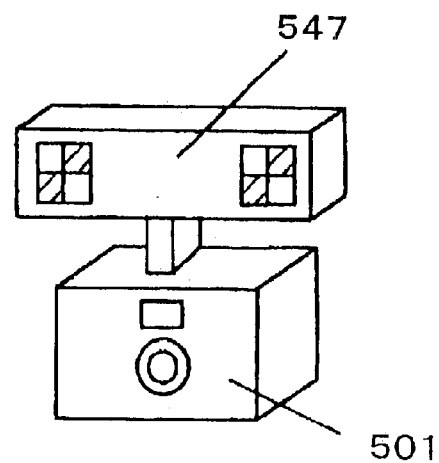

FIG. 37(a) illustrates an external light source having an external strobe device for photography, mounted thereon with a light source as shown in FIGS. 2 and 24. It is used by connecting it to the camera housing 501 as shown in FIG. 37(b) through a joint 549. FIG. 38 illustrates an exemplary light source for eliminating any shadow of the object as shown in FIGS. 35 and 36.

In FIG. 38(a), light sources are symmetrically arranged on both sides of the joint 549. A view of the light sources connected to the camera is shown in FIG. 38(b). Also, in FIGS. 37 and 38, the camera body is connected to the light sources using a structure such as a strobe shoe for film cameras, and a mounting method using a tripod mounting screw for cameras is shown in FIG. 39(a).

Figure 39:
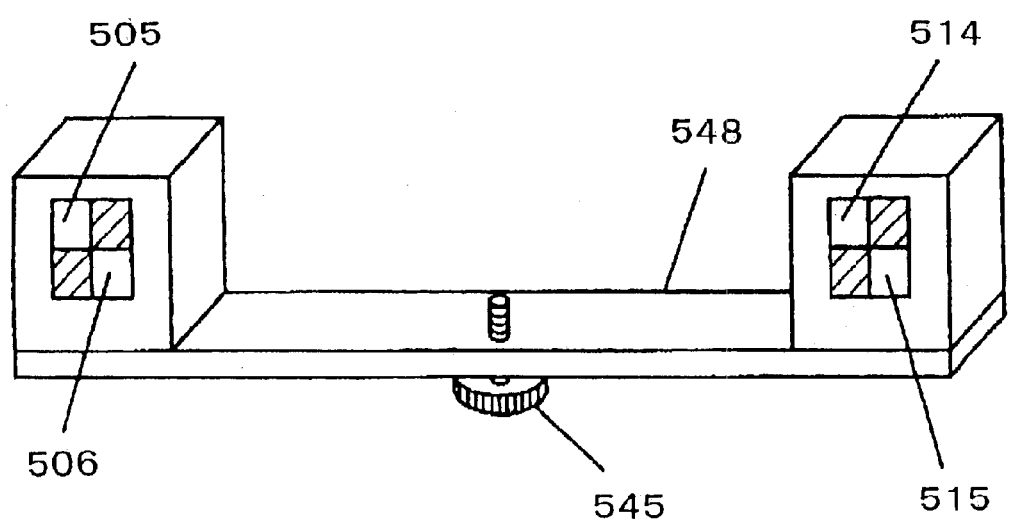
FIGS. 39(a) and (b) illustrate an external light source part in a camera according to the fourth and fifth embodiments of the present invention.
Figure 39:
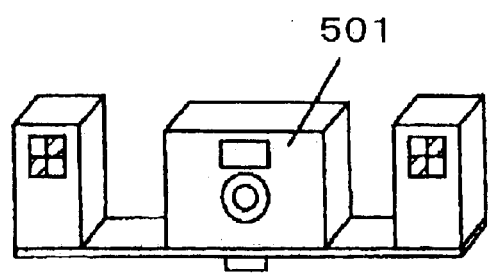
Figure 40:
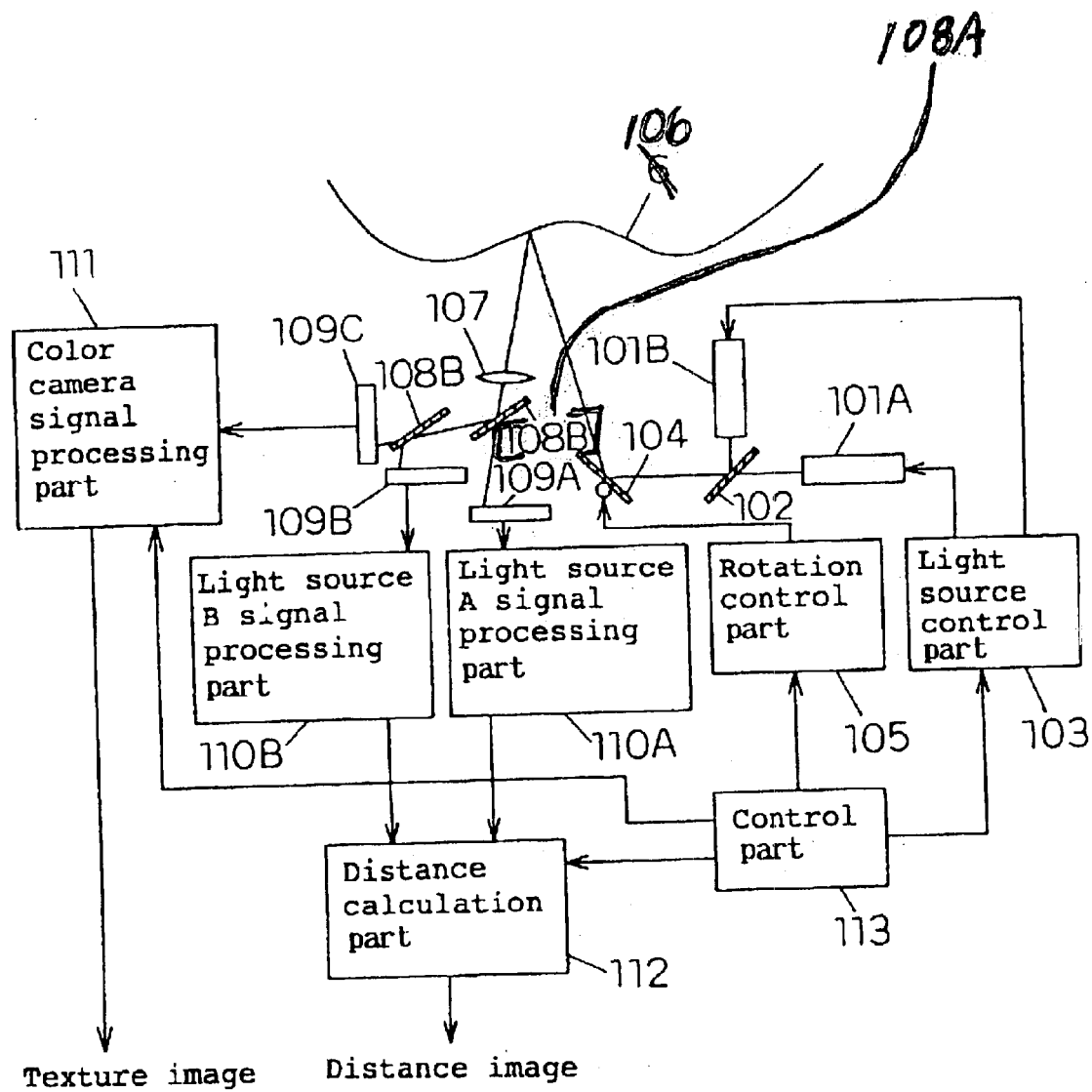
FIG. 40 is a block diagram illustrating a conventional range finder device.
Figure 41:
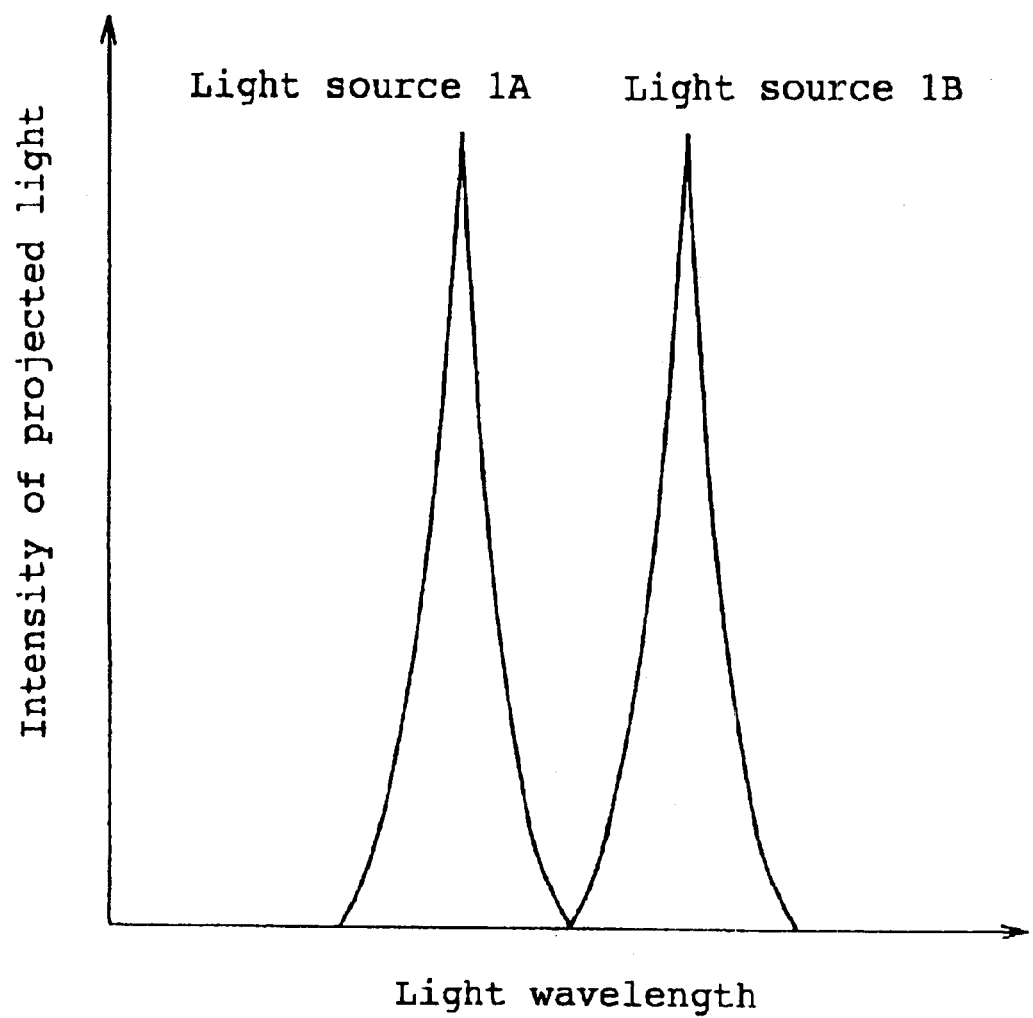
FIG. 41 is a characteristic diagram illustrating wavelength characteristics of a light source for a conventional range finder device.
Figure 42:
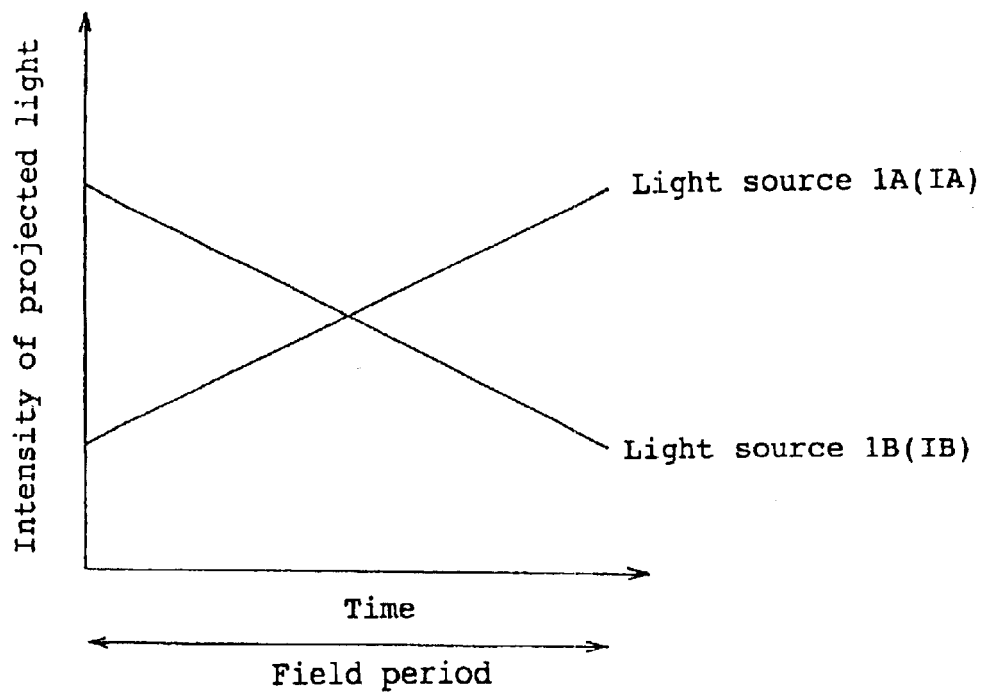
FIGS. 42(a) and (b) are characteristic diagrams illustrating intensity modulation in a light source for a conventional range finder device.
Figure 42:
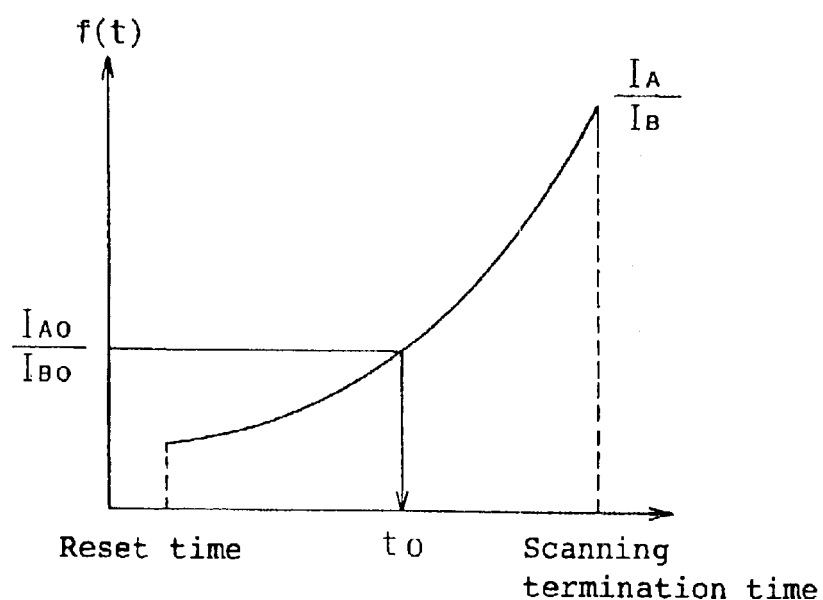
Figure 43:
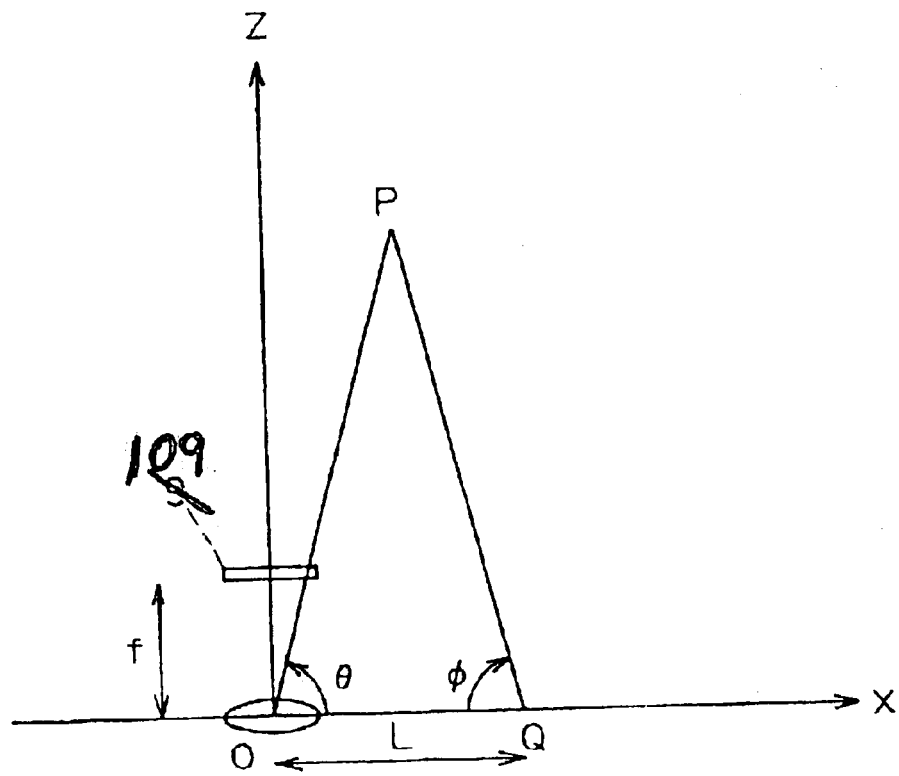
FIGS. 43(a) and (b) are views illustrating measurement principles in a range finder.
Figure 43:
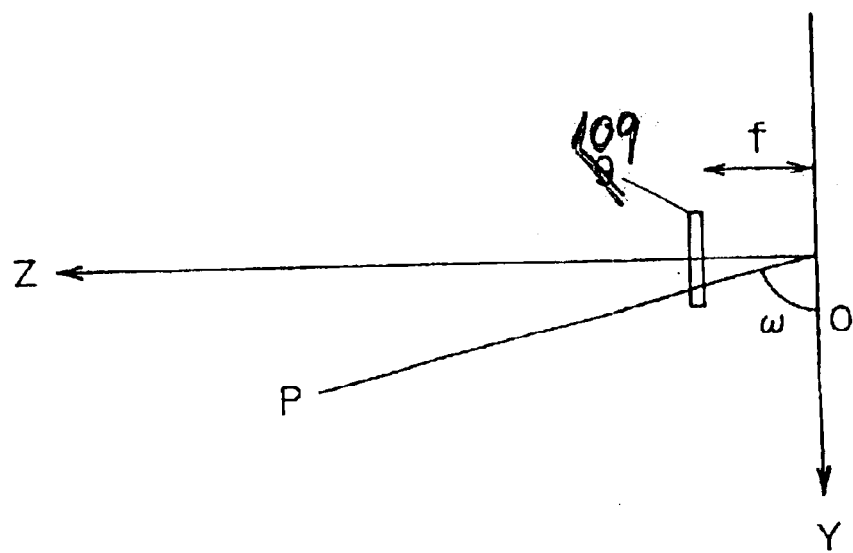

In this case, it is configured such that a screw at the bottom of the camera housing 501 is used as shown in FIG. 39(b). If the light sources are separated (e.g., a removable external light source device), the camera is large only during depth image picking up, but when used as a normal camera, it is conveniently compact and lightweight.

Also, in the fifth embodiment, the user can denote a coordinate using the touch panel in the configuration of FIG. 31, and other means can be used. When for example, a personal computer is used, an input device such as a mouse or a keyboard can be used. In addition, a track ball, a switch, a volume and the like can also be utilized.

Figure 32:
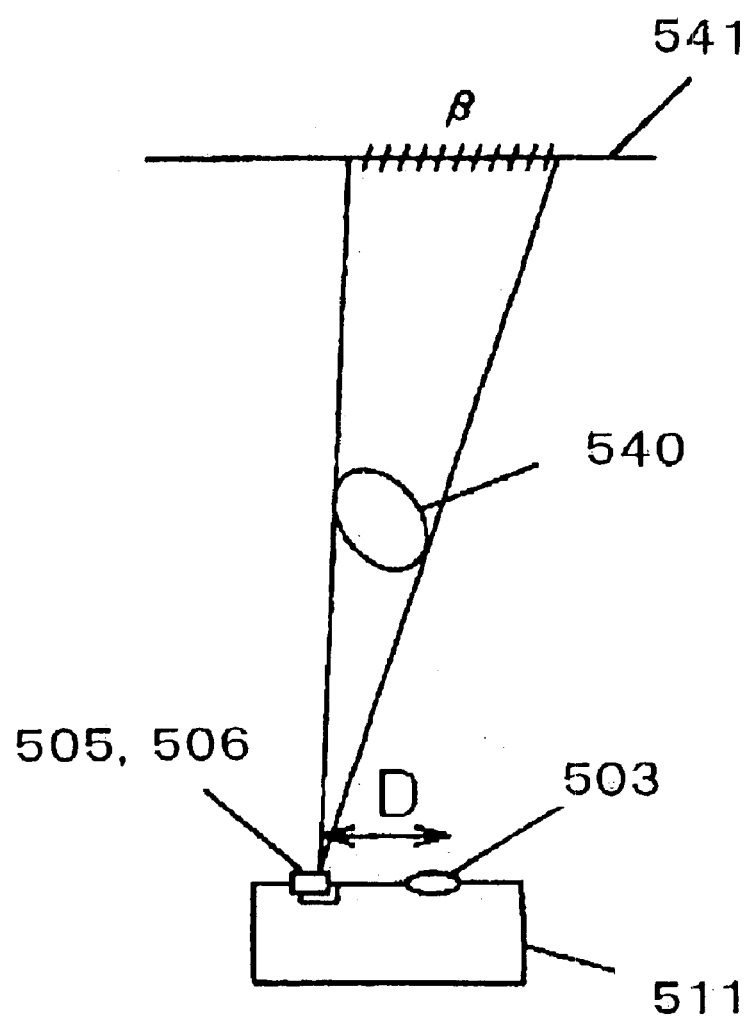
FIG. 32 is a view illustrating occlusion in cameras according to the fourth and fifth embodiments of the present invention.
Figure 33:
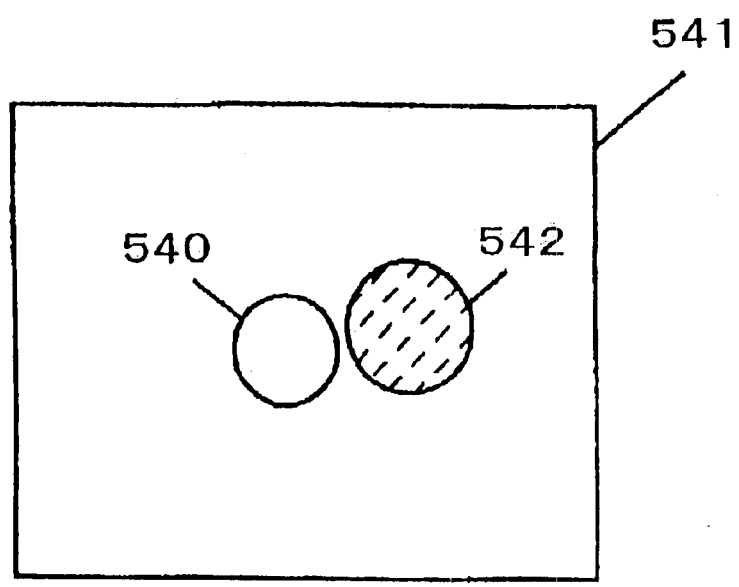
FIG. 33 is a view illustrating occlusion in cameras according to the fourth and fifth embodiments of the present invention.

Also, in the fourth and fifth embodiments, the first and second strobes 505 and 506 in two light source parts are arranged at one side of the image pickup part 533 as shown in FIGS. 13, 21, 22 and 23, and in this case, when an object 540 and the background 541 are image-picked up in an arrangement such as that shown in FIG. 32, light from the light sources is intercepted by the object 540 (as shown in FIG. 33) to cause a shadow 542 in an obtained image.

Figure 34:
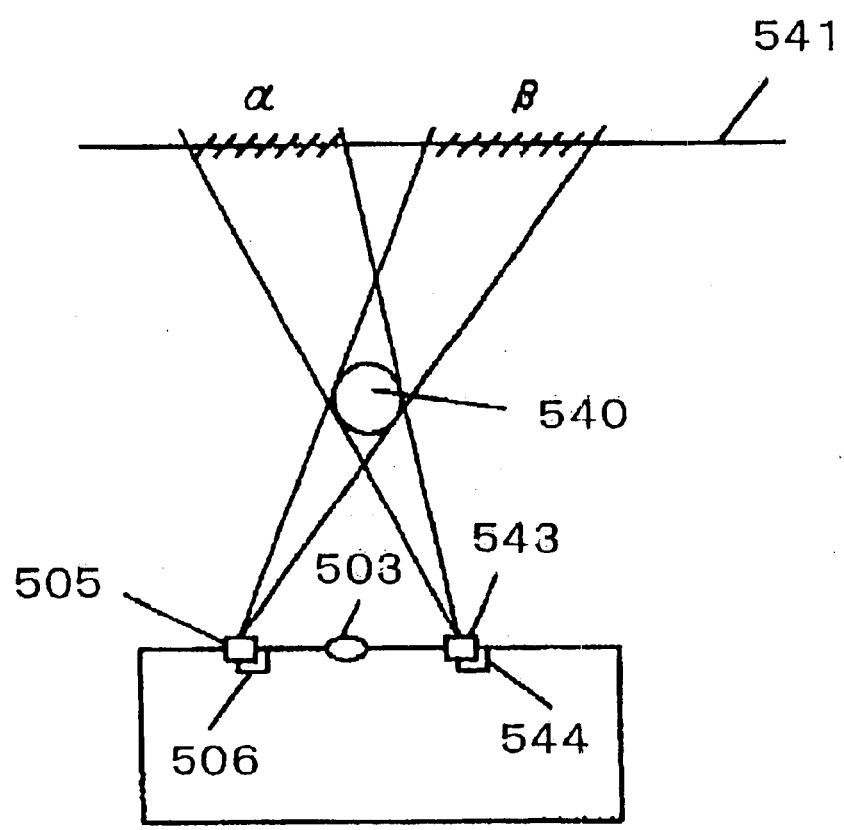
FIG. 34 is a view illustrating a method of avoiding occlusion in cameras according to the fourth and fifth embodiments of the present invention.

This is an area where light from the light sources does not reach, and is an area where any information of a distance image cannot be obtained. In this case, light sources 543 and 544 having the same configuration as the first and second strobes 505 and 506 in the light sources and are arranged at a side opposite thereto with the lens at the center as shown in FIG. 34, whereby the area of the shadow can be eliminated. The method will be described below.

When the first and second strobes 505 and 506 in the light sources are used, an area P is a portion where information of a distance image cannot be obtained, and when the light sources 543 and 544 are used, an area a is a portion where information of a distance image cannot be obtained. In the same manner as in the foregoing calculation, a distance image A and a color image A (when the first and second strobes 505 and 506 in the light sources are used), and a distance image B and a color image B (when the light sources 543 and 544 are used), are independently calculated respectively in advance. At this time, in the respective images, the portions in the areas p and a are judged to be portions having low luminance from the image data obtained in advance.

Next, the distance images A and B are synthesized to generate a distance image free from any shadow area. This can be realized by adopting, if there exists an area which is not judged as the above-described portion having low luminance in either of the distance images A and B, its value, and if neither of them is not the shadow area, by using an average value of both pieces of image data.

The same is applicable to a color image, and if at least either of the color images A and B has data other than the shadow portion, it is possible to synthesize a new color image free from any shadow area.

In the foregoing configuration, it is necessary that light sources be arranged on the lateral sides or vertical sides of the lens. In this case, if the housing is configured such that housings 512 and 513 containing light source parts on the lateral sides of the camera body 511 are slid in opposite directions so as to be extended as shown in FIG. 35, the user can reduce the size as shown in FIG. 35(a) for carrying the camera, and extend it as shown in FIG. 35(b) to make the base length D large during use, making it possible to prevent the depth image measuring accuracy from being degraded.

Also, a similar effect can be obtained even if the configuration is such that the camera housing and the light sources can be folded into three stages as shown in FIG. 36. While carrying the camera, the size can be reduced by folding the camera as shown in FIG. 36(a), and during use, the base length D can be enlarged as shown in FIG. 36(b).

Also, in order to arrange the lens and the light sources vertically as shown in FIG. 21(c), the housings 512 and 513 of FIG. 35 can be arranged on the vertical sides of the housing 511, and in FIG. 36, the housings 512 and 513 can be arranged on the vertical sides of the housing 511.

INDUSTRIAL APPLICABILITY

As will be apparent from the foregoing description, according to a range finder device of the present invention, it is possible to provide, at low cost, a highly reliable range finder device capable of using electronic operations and not mechanical operations.

Also, according to a range finder device of the present invention, measuring a distance with excellent accuracy, even if light from the light source has a two-dimensional pattern, may be accomplished.

Also, according to a range finder device of the present invention, measuring a distance of an object in a place where light from the light source cannot be directly irradiated onto an object may be accomplished.

Further, according to a camera of the present invention as described above, a light source part having a simple configuration and high serviceability can be realized. Also, the depth image measuring accuracy is not degraded because the distance between the camera lens and the light sources can be secured more than several tens of centimeters during use although it is small during carrying. Also, the length and size of the object can be measured without touching, and the size of an object can be determined from a color image once the image is picked up. Also, it is possible to provide a shape measuring camera and an object extracting camera capable of simple extraction of an object from an image photographed.

What is claimed is:

1. A camera for shape measuring or object extracting, comprising:

light-emitting means of irradiating an object with projected light having a specified radiation pattern; and an image-pickup lens for picking up reflected light of said light-emitting means from said object to obtain a depth image using light intensity of an image picked up;

wherein said camera has a moveable structure for varying to a predetermined set distance a distance between said light-emitting means and said image-pickup lens; and said predetermined set distance between said light-emitting means and said image-pickup lens is of a magnitude to obtain the depth image.

2. The camera according to claim 1, wherein:

said predetermined set distance between said light-emitting means and said image-pickup lens is realized by said light-emitting means and a main body of said camera, including said image-pickup lens, being relatively slidable; and during use of said camera, said light-emitting means and said main body are caused to slide such that they are spaced apart from each other by the predetermined set distance, whereby said predetermined set distance between said light-emitting means and said camera lens is of the magnitude to obtain the depth image.

3. The camera according to claim 1, wherein:

said predetermined set distance between said light-emitting means and said image-pickup lens is realized by said light-emitting means and a main body of the camera, including said image-pickup lens, being connected together by a hinge configuration; and during use of said camera, the hinge configuration between said light-emitting means and said main body is opened, whereby said predetermined set distance between said light-emitting means and said camera lens is of the magnitude to obtain the depth image.

4. The camera according to claim 1, wherein said light-emitting means irradiate said object with a plurality of projected lights, each light having a different specified radiation pattern than the other lights.

5. The camera according to claim 1, wherein light-emitting means irradiate said object with a flash projecting said light having said specified radiation pattern.

* * * * *